(12) United States Patent
Gong et al.

(10) Patent No.: US 12,164,091 B2
(45) Date of Patent: Dec. 10, 2024

(54) OPTICAL IMAGING LENS

(71) Applicant: GENIUS ELECTRONIC OPTICAL (XIAMEN) CO., LTD., Fujian (CN)

(72) Inventors: Jinhui Gong, Fujian (CN); Chuanbo Dong, Fujian (CN); Jiayuan Zhang, Fujian (CN); Hung-Chien Hsieh, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 204 days.

(21) Appl. No.: 17/844,056

(22) Filed: Jun. 20, 2022

(65) Prior Publication Data
US 2023/0236395 A1   Jul. 27, 2023

(30) Foreign Application Priority Data
Jan. 27, 2022 (CN) .......................... 202210098690.3

(51) Int. Cl.
*G02B 15/14* (2006.01)
*G02B 13/18* (2006.01)

(52) U.S. Cl.
CPC ..... *G02B 15/143503* (2019.08); *G02B 13/18* (2013.01); *G02B 15/143103* (2019.08); *G02B 15/143507* (2019.08)

(58) Field of Classification Search
CPC ........ G02B 15/1431; G02B 15/143101; G02B 15/143103; G02B 15/143108; G02B 15/143107; G02B 15/1435; G02B 15/143501; G02B 15/143503; G02B 15/143505; G02B 15/143507
See application file for complete search history.

(56) References Cited

U.S. PATENT DOCUMENTS

| | | | | |
|---|---|---|---|---|
| 6,025,960 A | * | 2/2000 | Morooka | G02B 15/143103 359/689 |
| 6,271,973 B1 | * | 8/2001 | Ohtake | G02B 15/143103 359/689 |
| 2002/0196559 A1 | * | 12/2002 | Eguchi | G02B 15/143103 359/689 |
| 2005/0207025 A1 | * | 9/2005 | Enomoto | G02B 15/143103 359/689 |
| 2018/0172964 A1 | | 6/2018 | Kobayashi | |

(Continued)

FOREIGN PATENT DOCUMENTS

| CN | 106896480 | 6/2017 |
|---|---|---|
| CN | 112198629 | 1/2021 |

(Continued)

OTHER PUBLICATIONS

"Office Action of China Counterpart Application", issued on Feb. 2, 2024, p. 1-p. 6.

*Primary Examiner* — Darryl J Collins
(74) *Attorney, Agent, or Firm* — JCIPRNET

(57) ABSTRACT

An optical imaging lens includes first to third lens element groups in sequence along an optical axis from an object side to an image side. The first lens element group includes at least two lens elements. The second lens element group includes at least two lens elements. The third lens element group includes at least two lens elements. When the optical imaging lens is zoomed, at least one lens element group is moved toward a direction of the object side or the image side along the optical axis.

19 Claims, 37 Drawing Sheets

(56) References Cited

U.S. PATENT DOCUMENTS

| | | | |
|---|---|---|---|
| 2019/0324236 A1* | 10/2019 | Kim | G02B 13/02 |
| 2022/0035141 A1* | 2/2022 | Yeh | G02B 13/02 |
| 2022/0171171 A1* | 6/2022 | Yeh | G02B 9/34 |

FOREIGN PATENT DOCUMENTS

| | | |
|---|---|---|
| CN | 112965211 | 6/2021 |
| JP | 2012022105 | 2/2012 |
| JP | 2014145954 | 8/2014 |
| JP | 2017138490 | 8/2017 |

\* cited by examiner

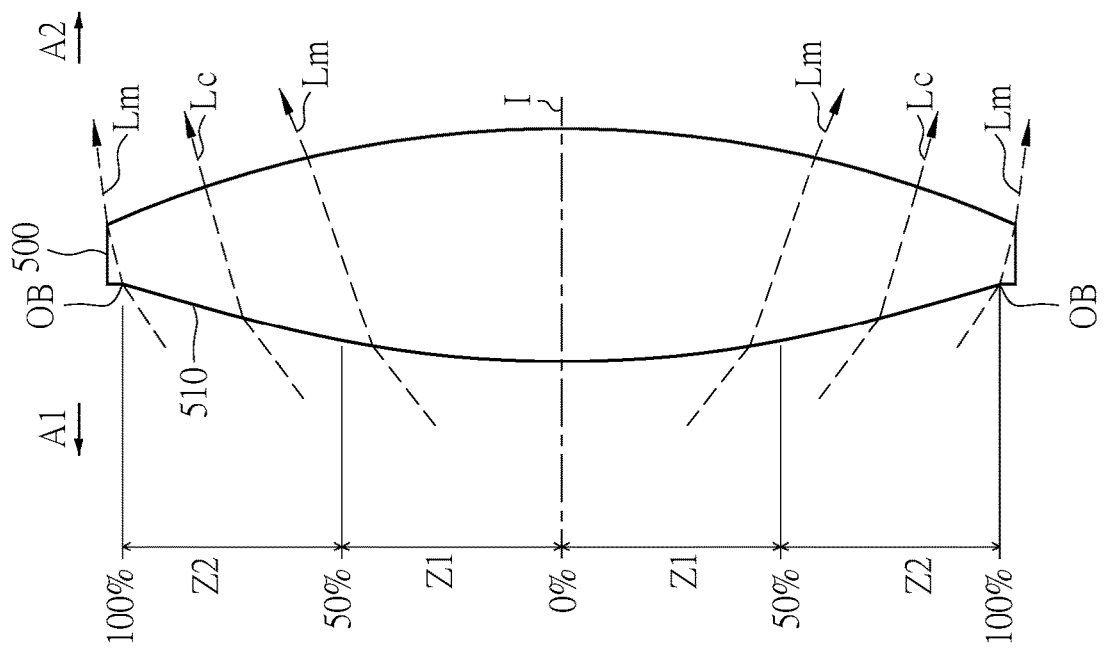
FIG. 5
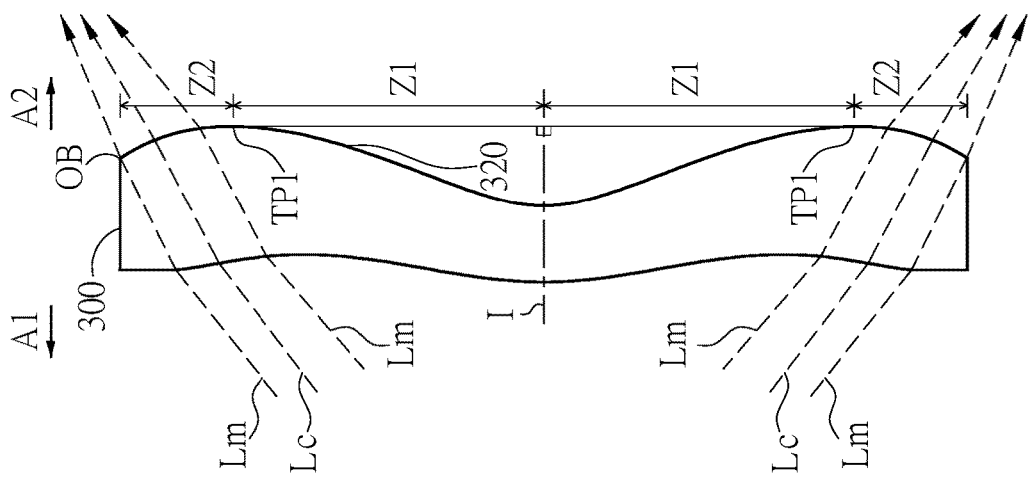
FIG. 4
FIG. 3

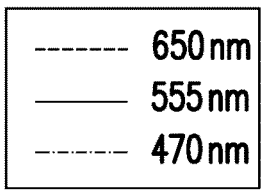
- - - - 650 nm
———— 555 nm
— - — 470 nm
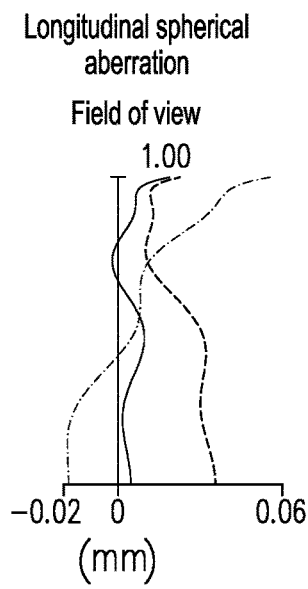
Longitudinal spherical aberration
Field of view
1.00
−0.02  0  0.06
(mm)
FIG. 7A
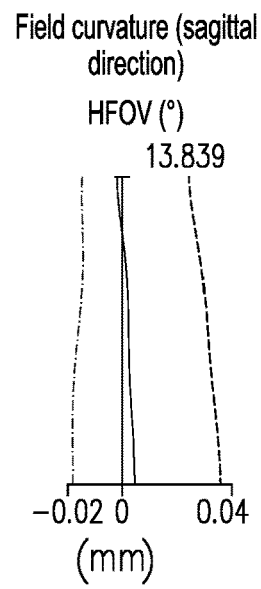
Field curvature (sagittal direction)
HFOV (°)
13.839
−0.02 0  0.04
(mm)
FIG. 7B
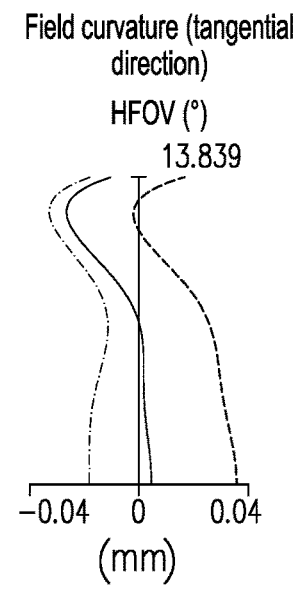
Field curvature (tangential direction)
HFOV (°)
13.839
−0.04  0  0.04
(mm)
FIG. 7C
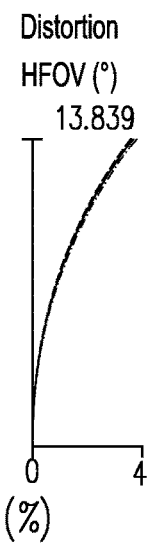
Distortion
HFOV (°)
13.839
0   4
(%)
FIG. 7D
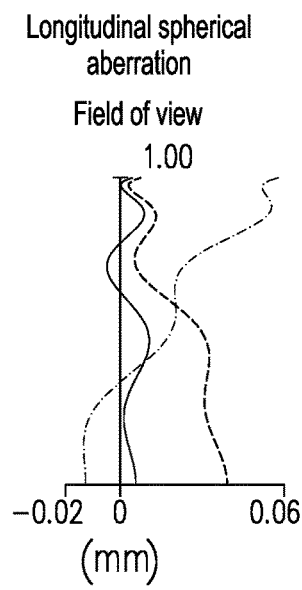
Longitudinal spherical aberration
Field of view
1.00
−0.02  0  0.06
(mm)
FIG. 7E
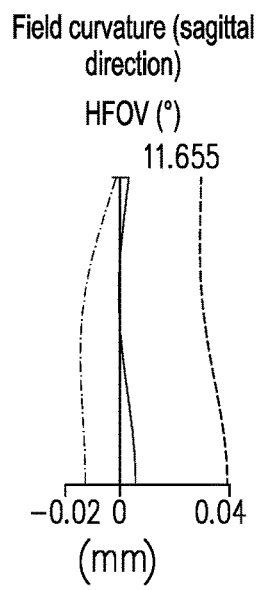
Field curvature (sagittal direction)
HFOV (°)
11.655
−0.02  0  0.04
(mm)
FIG. 7F
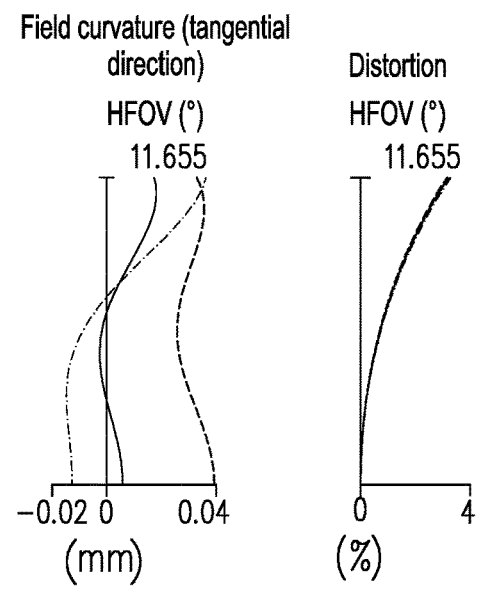
Field curvature (tangential direction)
HFOV (°)
11.655
−0.02  0  0.04
(mm)
FIG. 7G
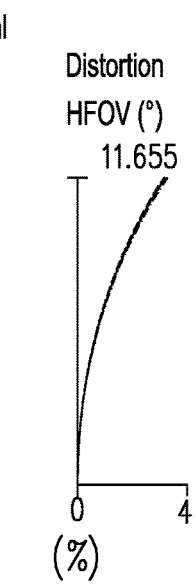
Distortion
HFOV (°)
11.655
0   4
(%)
FIG. 7H

| First embodiment | | | | | | |
|---|---|---|---|---|---|---|
| EFL=3.100 mm, f1= -93.359 mm, f2=7.245 mm, f3= -7.830 mm | | | | | | |
| Short focus (wide angle) | EFL=12.143 mm, Fno=2.669, HFOV=13.839°, TL=12.368 mm, BFL=4.172 mm, D1=1.629 mm, D2=2.093 mm, D3=2.026 mm | | | | | |
| Long focus (telephoto) | EFL=14.571 mm, Fno=3.203, HFOV=11.655°, TL=10.230 mm, BFL=6.310 mm D1=0.273 mm, D2=1.311 mm, D3=4.164 mm | | | | | |
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 13.133 | 0.542 | 1.636 | 23.972 | 18.611 |
| | Image-side surface 116 | -126.510 | 0.250 | | | |
| 1B lens element 12 | Object-side surface 125 | -28.549 | 0.558 | 1.640 | 23.529 | -38.803 |
| | Image-side surface 126 | 203.413 | 0.402 | | | |
| 1C lens element 13 | Object-side surface 135 | -20.166 | 1.002 | 1.671 | 19.243 | -23.924 |
| | Image-side surface 136 | 84.282 | D1 | | | |
| Aperture 0 | | Infinity | | | | |
| 2B lens element 22 | Object-side surface 225 | 17.677 | 1.100 | 1.671 | 19.243 | -39.591 |
| | Image-side surface 226 | 10.388 | 0.020 | | | |
| 2A lens element 21 | Object-side surface 215 | 6.171 | 1.519 | 1.531 | 55.754 | 6.053 |
| | Image-side surface 216 | -6.191 | D2 | | | |
| 3B lens element 32 | Object-side surface 325 | -11.537 | 1.100 | 1.671 | 19.243 | 46.409 |
| | Image-side surface 326 | -8.765 | 1.311 | | | |
| 3A lens element 31 | Object-side surface 315 | 29.361 | 0.842 | 1.536 | 55.981 | -6.679 |
| | Image-side surface 316 | 3.173 | D3 | | | |
| Filter 9 | Object-side surface 95 | Infinity | 0.210 | 1.517 | 64.167 | |
| | Image-side surface 96 | Infinity | 1.936 | | | |
| | Image plane 99 | Infinity | | | | |

FIG. 8

| Surface | K | $a_4$ | $a_6$ | $a_8$ |
|---|---|---|---|---|
| 115 | -1.817644E+01 | -1.272923E-03 | -2.170073E-04 | 3.534223E-05 |
| 116 | -5.491206E-02 | -1.350879E-03 | -7.743320E-05 | -2.135373E-05 |
| 125 | 9.760937E+00 | 3.137875E-04 | -2.036992E-04 | -3.123802E-05 |
| 126 | 9.187517E-03 | -1.717620E-03 | -2.238561E-04 | -1.680047E-05 |
| 135 | 1.107750E+01 | 3.209342E-04 | -2.587452E-05 | -9.001889E-06 |
| 136 | -1.079213E-01 | 5.504872E-04 | 4.652761E-05 | -7.643254E-05 |
| 225 | -1.945522E+01 | -2.750569E-03 | -1.723881E-04 | 2.115380E-05 |
| 226 | 7.392565E+00 | -2.454708E-03 | -2.677879E-04 | 3.783726E-05 |
| 215 | 1.594874E+00 | -9.099787E-04 | -2.592861E-04 | 2.148980E-05 |
| 216 | 1.166472E+00 | 1.156770E-03 | -3.116910E-05 | -2.657654E-07 |
| 325 | -4.211634E+01 | 3.206408E-03 | -2.579698E-04 | 7.389836E-05 |
| 326 | -6.160571E+00 | 6.463827E-03 | -1.315532E-03 | 3.746671E-04 |
| 315 | 5.770453E-01 | -1.930571E-02 | 2.722632E-04 | 6.828955E-04 |
| 316 | -3.021668E+00 | -1.522769E-02 | 2.694243E-03 | -3.143934E-04 |
| Surface | $a_{10}$ | $a_{12}$ | $a_{14}$ | $a_{16}$ |
| 115 | -1.149318E-05 | 1.875785E-06 | -1.393920E-07 | 3.720259E-09 |
| 116 | 2.688655E-06 | -8.386784E-08 | -6.740870E-10 | 0.000000E+00 |
| 125 | 7.193462E-06 | -9.272854E-07 | 4.255023E-08 | 0.000000E+00 |
| 126 | 2.795971E-06 | -3.745036E-07 | 1.971865E-08 | 0.000000E+00 |
| 135 | 1.127945E-06 | -2.157444E-07 | 1.982576E-08 | 0.000000E+00 |
| 136 | 2.751570E-05 | -4.566572E-06 | 2.906527E-07 | 0.000000E+00 |
| 225 | -3.933441E-06 | 2.440784E-07 | 6.994126E-09 | 0.000000E+00 |
| 226 | -3.635443E-06 | 1.553740E-07 | 3.803660E-10 | 0.000000E+00 |
| 215 | -1.614443E-06 | 3.157075E-08 | -5.431800E-10 | 0.000000E+00 |
| 216 | 3.423509E-07 | 2.130101E-08 | -3.004342E-09 | 0.000000E+00 |
| 325 | -1.700754E-05 | 3.030964E-06 | -2.457914E-07 | 8.011390E-09 |
| 326 | -7.786734E-05 | 9.096554E-06 | -3.108383E-07 | -9.034759E-09 |
| 315 | -3.282351E-04 | 7.104100E-05 | -6.401499E-06 | 1.299383E-07 |
| 316 | -3.172228E-06 | 7.802760E-06 | -6.239401E-07 | -2.169057E-08 |

FIG. 9

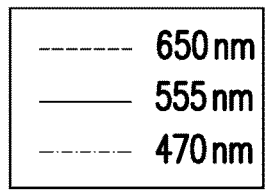
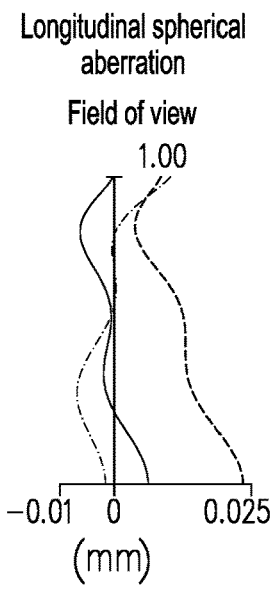 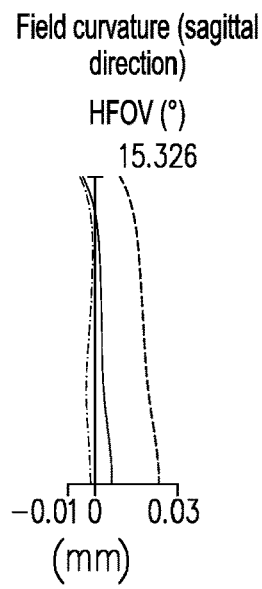 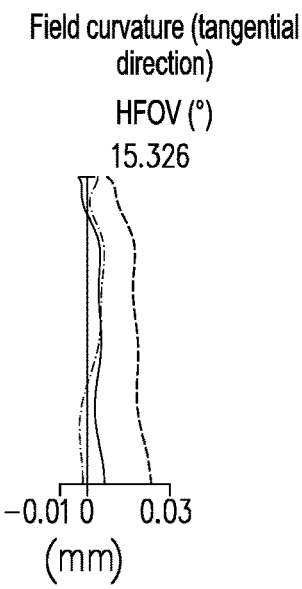 
FIG. 11A   FIG. 11B   FIG. 11C   FIG. 11D
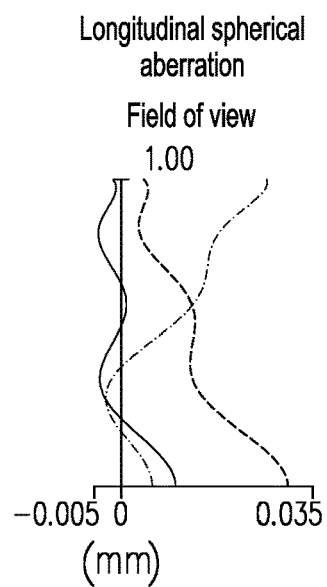 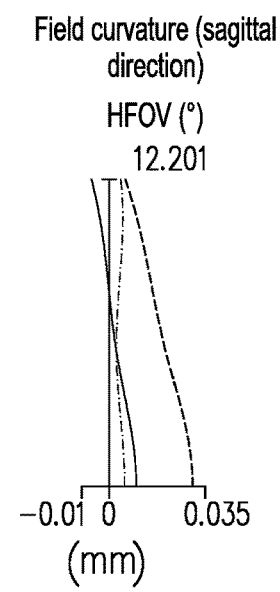 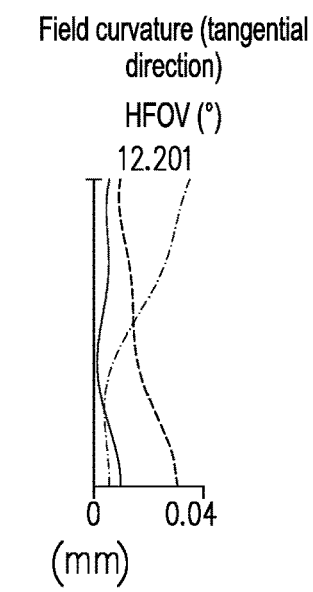 
FIG. 11E   FIG. 11F   FIG. 11G   FIG. 11H

| Second embodiment | | | | | | |
|---|---|---|---|---|---|---|
| EFL=3.100 mm, f1=124.101 mm, f2=7.754 mm, f3= -7.728 mm | | | | | | |
| Short focus (wide angle) | EFL=11.020 mm, Fno=2.597, HFOV=15.326°, TL=14.679 mm, BFL=2.480 mm, D1=2.139 mm, D2=2.788 mm, D3=1.936 mm | | | | | |
| Long focus (telephoto) | EFL=13.911 mm, Fno=3.278, HFOV=12.201°, TL=11.862 mm, BFL=5.296 mm D1=0.606 mm, D2=1.505 mm, D3=4.753 mm | | | | | |
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 11.823 | 1.049 | 1.567 | 37.490 | 16.182 |
| | Image-side surface 116 | -40.591 | 0.178 | | | |
| 1B lens element 12 | Object-side surface 125 | -21.448 | 0.368 | 1.567 | 37.490 | -45.371 |
| | Image-side surface 126 | -126.524 | 1.379 | | | |
| 1C lens element 13 | Object-side surface 135 | -16.034 | 0.200 | 1.588 | 28.433 | -27.384 |
| | Image-side surface 136 | -1544.053 | D1 | | | |
| Aperture 0 | | Infinity | | | | |
| 2B lens element 22 | Object-side surface 225 | 25.281 | 0.852 | 1.671 | 19.243 | -23.995 |
| | Image-side surface 226 | 9.760 | 0.020 | | | |
| 2A lens element 21 | Object-side surface 215 | 6.879 | 2.487 | 1.545 | 55.987 | 6.037 |
| | Image-side surface 216 | -5.526 | D2 | | | |
| 3B lens element 32 | Object-side surface 325 | -23.681 | 2.055 | 1.642 | 22.409 | 24.210 |
| | Image-side surface 326 | -9.752 | 0.329 | | | |
| 3A lens element 31 | Object-side surface 315 | 81.972 | 0.835 | 1.545 | 55.987 | -5.842 |
| | Image-side surface 316 | 3.061 | D3 | | | |
| Filter 9 | Object-side surface 95 | Infinity | 0.210 | 1.517 | 64.167 | |
| | Image-side surface 96 | Infinity | 0.334 | | | |
| | Image plane 99 | Infinity | | | | |

FIG. 12

| Surface | K | $a_4$ | $a_6$ | $a_8$ |
|---|---|---|---|---|
| 115 | -1.323617E+01 | -1.090128E-03 | -1.957208E-04 | 3.579491E-05 |
| 116 | -8.735438E-01 | -1.492726E-03 | -7.494456E-05 | -1.933512E-05 |
| 125 | -1.194362E+00 | 3.804383E-04 | -2.217945E-04 | -3.360653E-05 |
| 126 | -6.578199E-03 | -1.779829E-03 | -2.134735E-04 | -1.620189E-05 |
| 135 | 1.260058E+01 | 1.041308E-04 | -1.908938E-05 | -7.706606E-07 |
| 136 | -7.567804E-06 | 9.393667E-04 | 7.122583E-05 | -7.875183E-05 |
| 225 | 1.491840E+00 | -2.580675E-03 | -1.090990E-04 | 2.406355E-05 |
| 226 | 7.326363E+00 | -2.538264E-03 | -2.725826E-04 | 3.527675E-05 |
| 215 | 1.391629E+00 | -1.098517E-03 | -2.746259E-04 | 2.175986E-05 |
| 216 | 1.105582E+00 | 1.375231E-03 | 1.819947E-05 | -1.951579E-06 |
| 325 | -5.688308E+00 | 3.957314E-03 | -2.333972E-04 | 6.960636E-05 |
| 326 | -9.662724E+00 | 6.899100E-03 | -1.408197E-03 | 3.807786E-04 |
| 315 | -2.170757E-02 | -1.914984E-02 | 9.192979E-04 | 6.916064E-04 |
| 316 | -4.197266E+00 | -1.410301E-02 | 2.927117E-03 | -3.320398E-04 |
| Surface | $a_{10}$ | $a_{12}$ | $a_{14}$ | $a_{16}$ |
| 115 | -1.160421E-05 | 1.865269E-06 | -1.386533E-07 | 4.094532E-09 |
| 116 | 2.911492E-06 | -7.824053E-08 | -2.420365E-09 | 0.000000E+00 |
| 125 | 7.088874E-06 | -9.202691E-07 | 4.311383E-08 | 0.000000E+00 |
| 126 | 2.706916E-06 | -3.807197E-07 | 2.331243E-08 | 0.000000E+00 |
| 135 | 2.301203E-06 | -1.899055E-07 | 4.024242E-08 | 0.000000E+00 |
| 136 | 2.781860E-05 | -4.242906E-06 | 2.835758E-07 | 0.000000E+00 |
| 225 | -4.054551E-06 | 2.314555E-07 | 1.066023E-08 | 0.000000E+00 |
| 226 | -3.877271E-06 | 1.649034E-07 | 6.666887E-09 | 0.000000E+00 |
| 215 | -1.616766E-06 | 2.823625E-08 | 2.535954E-09 | 0.000000E+00 |
| 216 | 1.242822E-07 | 2.151978E-08 | -2.328248E-09 | 0.000000E+00 |
| 325 | -1.671481E-05 | 3.017425E-06 | -2.609019E-07 | 8.243825E-09 |
| 326 | -7.758611E-05 | 9.262406E-06 | -2.322309E-07 | 1.348137E-08 |
| 315 | -3.417104E-04 | 6.974359E-05 | -6.149198E-06 | 2.002303E-07 |
| 316 | -6.489168E-06 | 7.275410E-06 | -7.090474E-07 | 1.517703E-08 |

FIG. 13

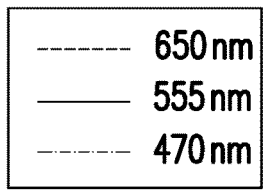
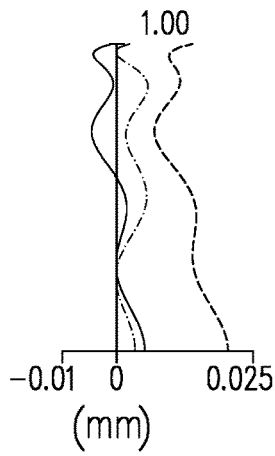
FIG. 15A
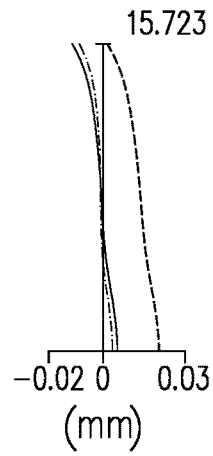
FIG. 15B
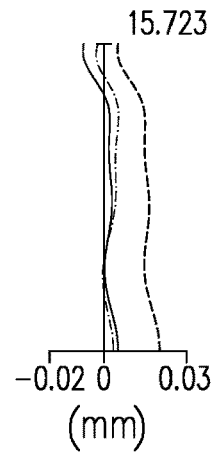
FIG. 15C
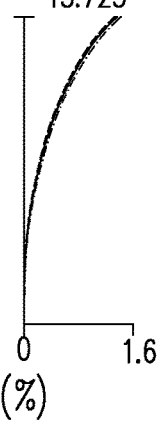
FIG. 15D
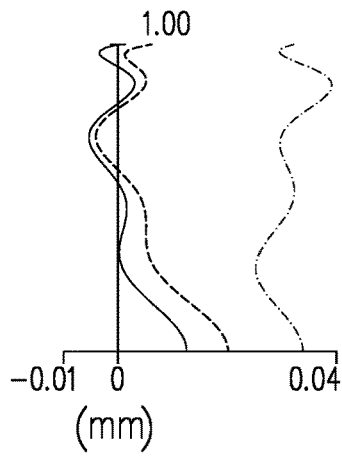
FIG. 15E
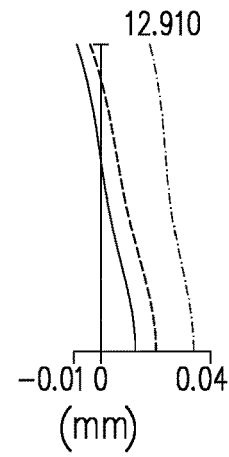
FIG. 15F
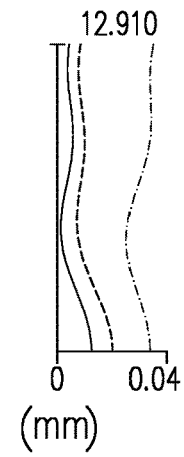
FIG. 15G
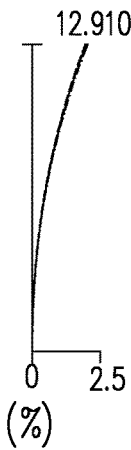
FIG. 15H

| Third embodiment ||||||
|---|---|---|---|---|---|
| EFL=3.100 mm, f1=77.769 mm, f2=8.196 mm, f3= -7.732 mm ||||||
| Short focus (wide angle) | EFL=10.871 mm, Fno=2.380, HFOV=15.723°, TL=15.742 mm, BFL=2.570 mm, D1=1.392 mm, D2=2.708 mm, D3=2.040 mm |||||
| Long focus (telephoto) | EFL=13.279 mm, Fno=2.908, HFOV=12.910°, TL=13.246 mm, BFL=5.066 mm D1=0.016 mm, D2=1.588 mm, D3=4.536 mm |||||
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 12.949 | 0.899 | 1.642 | 22.409 | 15.067 |
| | Image-side surface 116 | -38.441 | 0.099 | | | |
| 1B lens element 12 | Object-side surface 125 | -20.704 | 0.431 | 1.671 | 19.243 | -34.560 |
| | Image-side surface 126 | -180.295 | 0.282 | | | |
| 1C lens element 13 | Object-side surface 135 | -16.951 | 2.639 | 1.661 | 20.373 | -38.263 |
| | Image-side surface 136 | -53.598 | D1 | | | |
| Aperture 0 | | Infinity | | | | |
| 2B lens element 22 | Object-side surface 225 | 39.640 | 0.200 | 1.671 | 19.243 | -18.878 |
| | Image-side surface 226 | 9.650 | 0.307 | | | |
| 2A lens element 21 | Object-side surface 215 | 6.740 | 3.200 | 1.545 | 55.987 | 6.173 |
| | Image-side surface 216 | -5.616 | D2 | | | |
| 3B lens element 32 | Object-side surface 325 | -18.431 | 2.452 | 1.545 | 55.987 | 21.917 |
| | Image-side surface 326 | -7.599 | 0.523 | | | |
| 3A lens element 31 | Object-side surface 315 | -72.097 | 0.610 | 1.545 | 55.987 | -5.750 |
| | Image-side surface 316 | 3.294 | D3 | | | |
| Filter 9 | Object-side surface 95 | Infinity | 0.210 | 1.517 | 64.167 | |
| | Image-side surface 96 | Infinity | 0.320 | | | |
| | Image plane 99 | Infinity | | | | |

FIG. 16

| Surface | K | $a_4$ | $a_6$ | $a_8$ |
|---|---|---|---|---|
| 115 | -1.736934E+01 | -1.179340E-03 | -1.965670E-04 | 3.628409E-05 |
| 116 | 1.202709E+00 | -1.506169E-03 | -9.116781E-05 | -2.121171E-05 |
| 125 | -4.410280E+00 | 3.630400E-04 | -2.040875E-04 | -3.129751E-05 |
| 126 | -3.984528E-02 | -1.717415E-03 | -2.158773E-04 | -1.571335E-05 |
| 135 | 1.475889E+01 | 8.028057E-05 | -2.524218E-05 | -9.663036E-06 |
| 136 | 3.727907E-01 | 8.244962E-04 | 6.361888E-05 | -7.447949E-05 |
| 225 | -1.565521E+01 | -2.598266E-03 | -9.930345E-05 | 2.858610E-05 |
| 226 | 7.778226E+00 | -2.460958E-03 | -2.616188E-04 | 3.688270E-05 |
| 215 | 1.494383E+00 | -9.854455E-04 | -2.673574E-04 | 2.168395E-05 |
| 216 | 1.089353E+00 | 1.195678E-03 | 6.809189E-06 | 1.250919E-07 |
| 325 | -1.138505E+01 | 3.403662E-03 | -2.544776E-04 | 6.638600E-05 |
| 326 | -1.924257E+01 | 6.120847E-03 | -1.514102E-03 | 3.792880E-04 |
| 315 | 2.663603E-02 | -1.760972E-02 | 9.497212E-04 | 6.746674E-04 |
| 316 | -5.318635E+00 | -1.436551E-02 | 2.990267E-03 | -3.372726E-04 |
| Surface | $a_{10}$ | $a_{12}$ | $a_{14}$ | $a_{16}$ |
| 115 | -1.160995E-05 | 1.854721E-06 | -1.393691E-07 | 4.515685E-09 |
| 116 | 2.910769E-06 | -4.995193E-08 | 9.479960E-10 | 0.000000E+00 |
| 125 | 7.283579E-06 | -9.173731E-07 | 4.156769E-08 | 0.000000E+00 |
| 126 | 2.851068E-06 | -3.652539E-07 | 2.425876E-08 | 0.000000E+00 |
| 135 | 1.593057E-06 | -4.821861E-08 | 7.942176E-09 | 0.000000E+00 |
| 136 | 2.770707E-05 | -4.587039E-06 | 2.847201E-07 | 0.000000E+00 |
| 225 | -3.837304E-06 | 1.935046E-07 | 3.841887E-09 | 0.000000E+00 |
| 226 | -3.693979E-06 | 1.425401E-07 | -1.205702E-09 | 0.000000E+00 |
| 215 | -1.595892E-06 | 3.780761E-08 | -3.217220E-10 | 0.000000E+00 |
| 216 | 1.304548E-07 | 8.712073E-09 | -4.474310E-10 | 0.000000E+00 |
| 325 | -1.741600E-05 | 3.009271E-06 | -2.523267E-07 | 8.016322E-09 |
| 326 | -7.765305E-05 | 9.050167E-06 | -2.914258E-07 | -1.592604E-09 |
| 315 | -3.433476E-04 | 6.947198E-05 | -6.193560E-06 | 2.021858E-07 |
| 316 | -8.117716E-06 | 7.294752E-06 | -6.528791E-07 | 1.290727E-08 |

FIG. 17

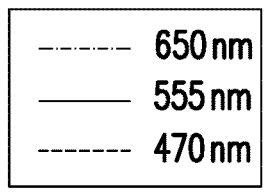
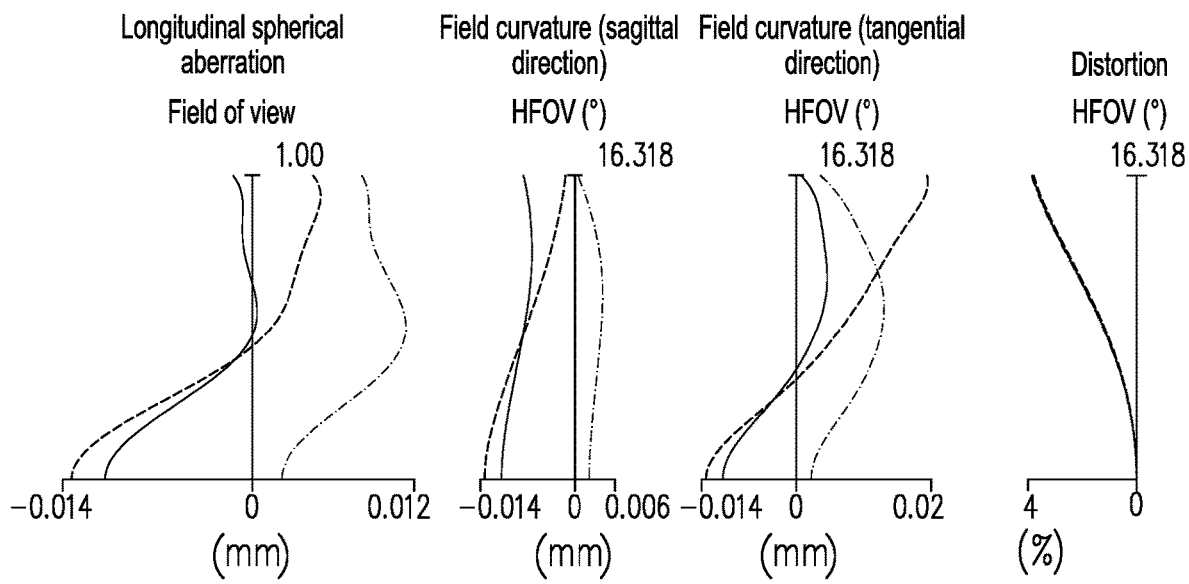
FIG. 19A  FIG. 19B  FIG. 19C  FIG. 19D
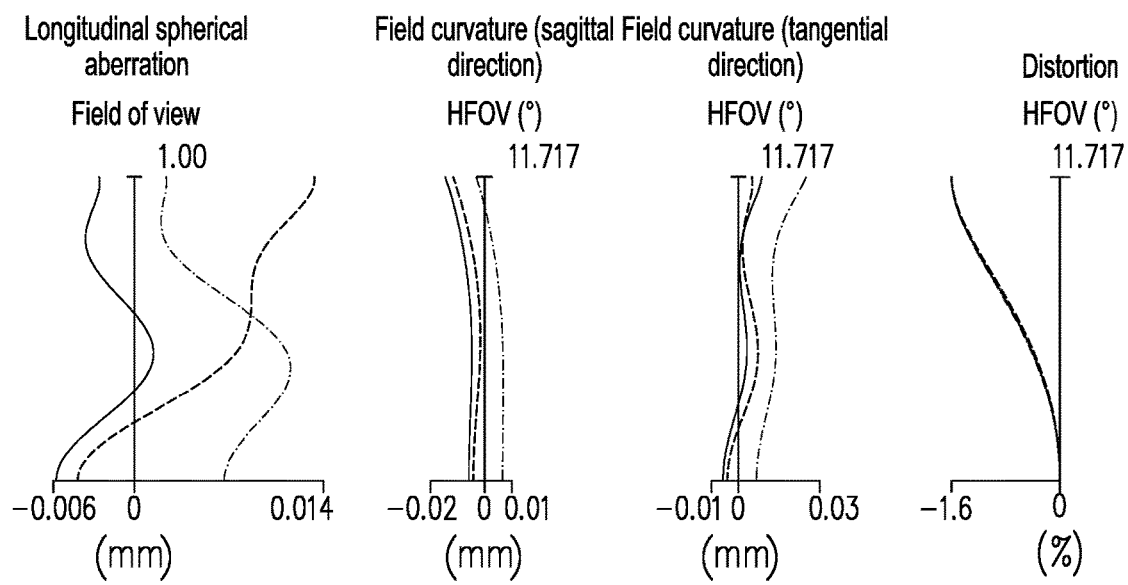
FIG. 19E  FIG. 19F  FIG. 19G  FIG. 19H

| Fourth embodiment |||||||
|---|---|---|---|---|---|---|
| EFL=3.100 mm, f1= -18.294 mm, f2=10.211 mm, f3=16.651 mm |||||||
| Short focus (wide angle) | EFL=11.000 mm, Fno=2.386, HFOV=11.717°, TL=17.609 mm, BFL=2.805 mm, D1=2.632 mm, D2=0.970 mm, D3=2.496 mm ||||||
| Long focus (telephoto) | EFL=15.181 mm, Fno=3.294, HFOV=16.318°, TL=16.501 mm, BFL=2.805 mm D1=0.066 mm, D2=2.428 mm, D3=3.605 mm ||||||
| Device | Surface | Radius of curvature (mm) | Thickness (mm) | Refractive index | Abbe number | Focal length (mm) |
| Object |  | Infinity | Infinity |  |  |  |
| 1A lens element 11 | Object-side surface 115 | 10.429 | 1.915 | 1.588 | 28.433 | 12.167 |
|  | Image-side surface 116 | -21.658 | 0.968 |  |  |  |
| 1B lens element 12 | Object-side surface 125 | -15.852 | 0.200 | 1.567 | 37.490 | -6.168 |
| Aperture 0 | Image-side surface 126 | 4.538 | D1 |  |  |  |
| 2B lens element 22 | Object-side surface 225 | 4.738 | 1.625 | 1.536 | 55.981 | 7.380 |
|  | Image-side surface 226 | -21.741 | 1.846 |  |  |  |
| 2A lens element 21 | Object-side surface 215 | -53.286 | 0.200 | 1.671 | 19.243 | -16.425 |
|  | Image-side surface 216 | 14.088 | D2 |  |  |  |
| 3C lens element 33 | Object-side surface 335 | 4.969 | 2.016 | 1.536 | 55.981 | 7.387 |
|  | Image-side surface 336 | -17.138 | 0.120 |  |  |  |
| 3B lens element 32 | Object-side surface 325 | -9.583 | 3.838 | 1.671 | 19.243 | 18.775 |
|  | Image-side surface 326 | -6.350 | 0.078 |  |  |  |
| 3A lens element 31 | Object-side surface 315 | 48.256 | 1.200 | 1.536 | 55.981 | -6.118 |
|  | Image-side surface 316 | 3.058 | D3 |  |  |  |
| Filter 9 | Object-side surface 95 | Infinity | 0.210 | 1.517 | 64.167 |  |
|  | Image-side surface 96 | Infinity | 0.100 |  |  |  |
|  | Image plane 99 | Infinity |  |  |  |  |

FIG. 20

| Surface | K | $a_4$ | $a_6$ | $a_8$ |
|---|---|---|---|---|
| 115 | -1.567598E+01 | -5.204634E-04 | -2.024424E-04 | 0.000000E+00 |
| 116 | -6.585849E+01 | -3.522759E-03 | 4.943809E-06 | 0.000000E+00 |
| 125 | -5.364180E+01 | -3.967954E-04 | 9.028463E-05 | 0.000000E+00 |
| 126 | -1.581818E+00 | 1.553475E-03 | -9.868756E-05 | 6.409936E-06 |
| 225 | -1.999940E+00 | 1.698135E-03 | -6.120648E-06 | -3.254904E-07 |
| 226 | -8.407126E+01 | -1.412958E-03 | 1.118563E-04 | -4.985055E-06 |
| 215 | -6.891578E+02 | 3.328543E-04 | 1.148076E-04 | -7.348659E-06 |
| 216 | 9.545248E+00 | 2.801863E-03 | 9.301911E-05 | 2.245077E-06 |
| 335 | -1.988505E+00 | 9.191917E-04 | 4.533810E-06 | 4.158070E-07 |
| 336 | 6.709636E+00 | 7.759432E-04 | -1.296760E-04 | -9.537693E-07 |
| 325 | -2.147376E+01 | 1.211357E-03 | -1.073907E-04 | 0.000000E+00 |
| 326 | -8.824990E+00 | -2.062115E-03 | 2.654667E-04 | -2.041619E-05 |
| 315 | 1.103445E+02 | -2.361129E-02 | 3.051460E-03 | -2.261903E-04 |
| 316 | -5.007401E+00 | -1.227742E-02 | 2.551730E-03 | -3.098789E-04 |
| Surface | $a_{10}$ | $a_{12}$ | $a_{14}$ | |
| 115 | 0.000000E+00 | 0.000000E+00 | 0.000000E+00 | |
| 116 | 0.000000E+00 | 0.000000E+00 | 0.000000E+00 | |
| 125 | 0.000000E+00 | 0.000000E+00 | 0.000000E+00 | |
| 126 | -3.430510E-07 | 0.000000E+00 | 0.000000E+00 | |
| 225 | 4.337094E-08 | 0.000000E+00 | 0.000000E+00 | |
| 226 | 1.017295E-07 | 0.000000E+00 | 0.000000E+00 | |
| 215 | -2.859473E-07 | 0.000000E+00 | 0.000000E+00 | |
| 216 | -3.223121E-07 | 0.000000E+00 | 0.000000E+00 | |
| 335 | -4.202734E-09 | 0.000000E+00 | 0.000000E+00 | |
| 336 | 1.777392E-07 | 0.000000E+00 | 0.000000E+00 | |
| 325 | 0.000000E+00 | 0.000000E+00 | 0.000000E+00 | |
| 326 | 0.000000E+00 | 0.000000E+00 | 0.000000E+00 | |
| 315 | 6.486389E-06 | 0.000000E+00 | 0.000000E+00 | |
| 316 | 3.002241E-05 | -1.923668E-06 | 5.887333E-08 | |

FIG. 21

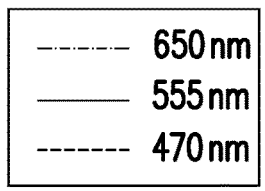
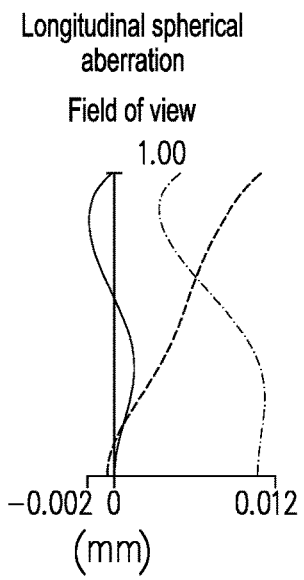
FIG. 23A   FIG. 23B   FIG. 23C   FIG. 23D
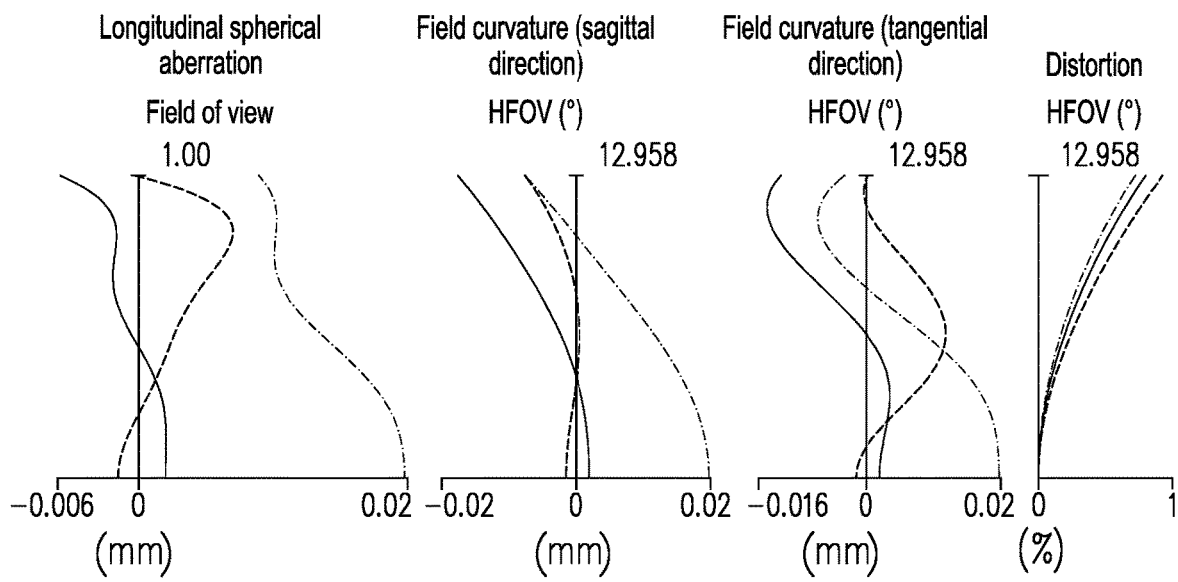
FIG. 23E   FIG. 23F   FIG. 23G   FIG. 23H

| Fifth embodiment ||||||
|---|---|---|---|---|---|
| EFL=3.100 mm, f1= -34.556 mm, f2=6.372 mm, f3= -8.564 mm ||||||
| Short focus (wide angle) | EFL=8.910 mm, Fno=2.195, HFOV=12.958°, TL=14.406 mm, BFL=2.063 mm, D1=3.294 mm, D2=1.961 mm, D3=1.530 mm |||||
| Long focus (telephoto) | EFL=13.369 mm, Fno=3.294, HFOV=19.876°, TL=10.291 mm, BFL=6.389 mm D1=1.007 mm, D2=0.134 mm, D3=5.857 mm |||||
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 9.403 | 1.096 | 1.588 | 28.433 | 12.517 |
| | Image-side surface 116 | -33.365 | 0.050 | | | |
| 1B lens element 12 | Object-side surface 125 | 245.595 | 0.391 | 1.567 | 37.490 | -8.567 |
| Aperture 0 | Image-side surface 126 | 4.785 | D1 | | | |
| 2C lens element 23 | Object-side surface 235 | 4.799 | 2.266 | 1.536 | 55.981 | 7.868 |
| | Image-side surface 236 | -30.283 | 0.392 | | | |
| 2B lens element 22 | Object-side surface 225 | -25.769 | 0.200 | 1.671 | 19.243 | -12.109 |
| | Image-side surface 226 | 12.074 | 0.574 | | | |
| 2A lens element 21 | Object-side surface 215 | 4.941 | 1.368 | 1.536 | 55.981 | 7.741 |
| | Image-side surface 216 | -24.135 | D2 | | | |
| 3B lens element 32 | Object-side surface 325 | -6.805 | 1.487 | 1.671 | 19.243 | 23.881 |
| | Image-side surface 326 | -5.213 | 0.145 | | | |
| 3A lens element 31 | Object-side surface 315 | 10.019 | 1.181 | 1.536 | 55.981 | -6.536 |
| | Image-side surface 316 | 2.498 | D3 | | | |
| Filter 9 | Object-side surface 95 | Infinity | 0.210 | 1.517 | 64.167 | |
| | Image-side surface 96 | Infinity | 0.322 | | | |
| | Image plane 99 | Infinity | | | | |

FIG. 24

| Surface | K | $a_4$ | $a_6$ | $a_8$ |
|---|---|---|---|---|
| 115 | -1.622497E+01 | -2.672524E-03 | -5.740149E-04 | 0.000000E+00 |
| 116 | 1.034909E+02 | -5.272755E-03 | -9.852361E-05 | 0.000000E+00 |
| 125 | -1.588165E+04 | 7.976530E-06 | 4.217005E-05 | 0.000000E+00 |
| 126 | -2.144911E+00 | 1.075862E-03 | -2.250862E-04 | 4.384434E-06 |
| 235 | -1.833696E+00 | 1.557680E-03 | -4.793462E-05 | 1.487632E-06 |
| 236 | 4.701770E+01 | -2.851394E-03 | 2.204115E-04 | -4.088825E-06 |
| 225 | -2.675985E+01 | 2.418992E-04 | 1.207529E-04 | 9.812849E-07 |
| 226 | 6.481952E+00 | 1.318000E-03 | 7.418720E-05 | 3.299365E-06 |
| 215 | -4.051226E+00 | 1.996691E-04 | -1.049885E-04 | -8.967879E-06 |
| 216 | 3.993031E+01 | 5.910938E-04 | -1.860629E-04 | 1.035484E-06 |
| 325 | -2.831734E+01 | 1.370761E-03 | 1.907157E-04 | 0.000000E+00 |
| 326 | -1.142677E+01 | -1.616032E-03 | 3.615486E-04 | 2.178581E-06 |
| 315 | -5.025110E+01 | -2.783186E-02 | 3.037365E-03 | -1.950910E-04 |
| 316 | -4.745410E+00 | -1.417421E-02 | 2.680399E-03 | -3.453364E-04 |
| Surface | $a_{10}$ | $a_{12}$ | $a_{14}$ | |
| 115 | 0.000000E+00 | 0.000000E+00 | 0.000000E+00 | |
| 116 | 0.000000E+00 | 0.000000E+00 | 0.000000E+00 | |
| 125 | 0.000000E+00 | 0.000000E+00 | 0.000000E+00 | |
| 126 | 6.474903E-08 | 0.000000E+00 | 0.000000E+00 | |
| 235 | -3.981167E-08 | 0.000000E+00 | 0.000000E+00 | |
| 236 | 1.242846E-07 | 0.000000E+00 | 0.000000E+00 | |
| 225 | -1.931192E-08 | 0.000000E+00 | 0.000000E+00 | |
| 226 | 2.859436E-07 | 0.000000E+00 | 0.000000E+00 | |
| 215 | 8.318204E-07 | 0.000000E+00 | 0.000000E+00 | |
| 216 | 1.698431E-07 | 0.000000E+00 | 0.000000E+00 | |
| 325 | 0.000000E+00 | 0.000000E+00 | 0.000000E+00 | |
| 326 | 0.000000E+00 | 0.000000E+00 | 0.000000E+00 | |
| 315 | 4.777931E-06 | 0.000000E+00 | 0.000000E+00 | |
| 316 | 3.186243E-05 | -1.883272E-06 | 5.253979E-08 | |

FIG. 25

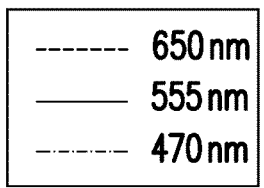
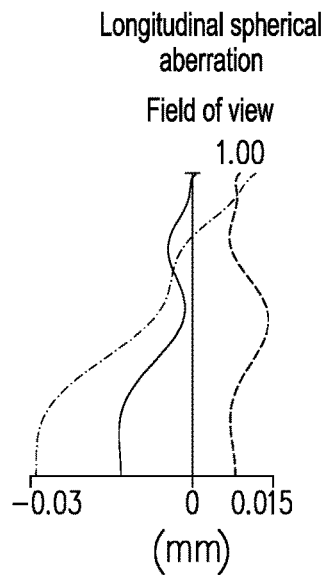
FIG. 27A
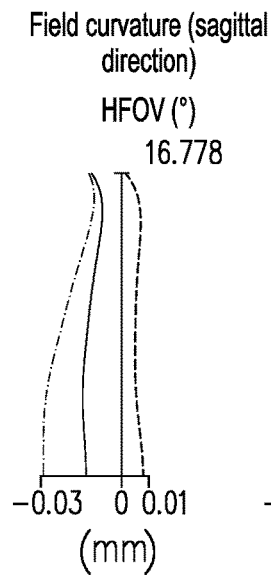
FIG. 27B
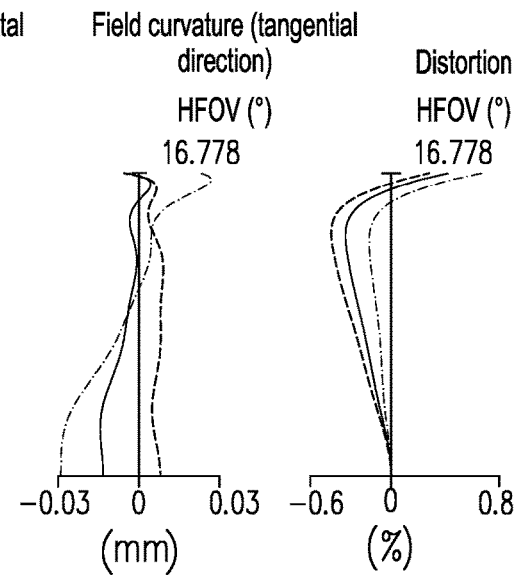
FIG. 27C    FIG. 27D
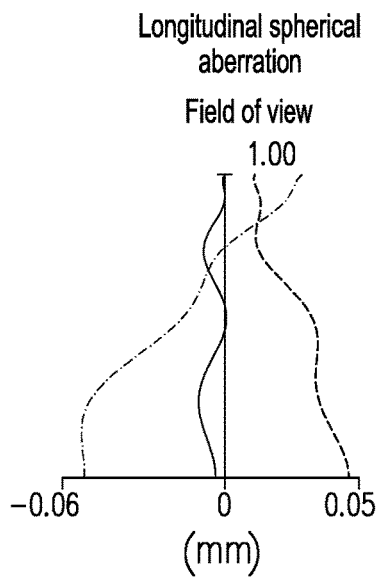
FIG. 27E
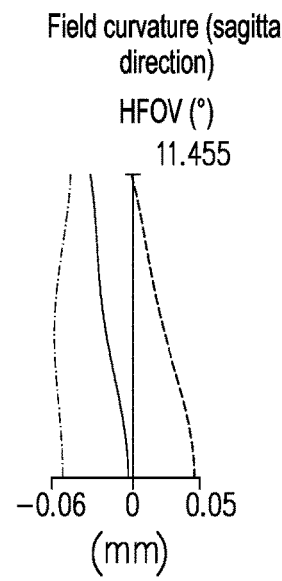
FIG. 27F
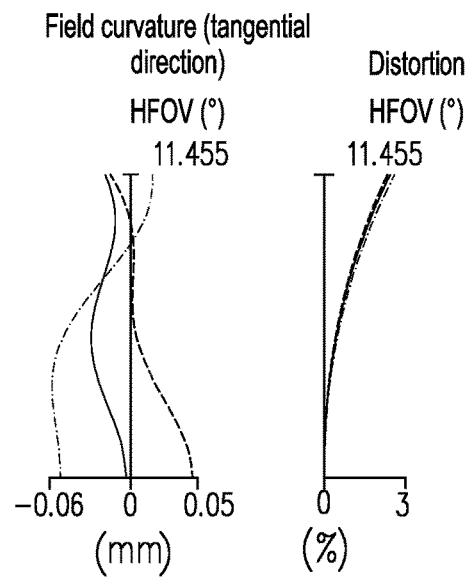
FIG. 27G    FIG. 27H

| Sixth embodiment |||||||
|---|---|---|---|---|---|---|
| EFL=3.100 mm, f1=155.899 mm, f2=7.955 mm, f3= -8.220 mm |||||||
| Short focus (wide angle) | EFL=10.221 mm, Fno=2.244, HFOV=16.778°, TL=16.174 mm, BFL=1.728 mm, D1=3.581 mm, D2=3.581 mm, D3=1.450 mm ||||||
| Long focus (telephoto) | EFL=14.930 mm, Fno=3.278, HFOV=11.455°, TL=11.442 mm, BFL=6.455 mm D1=1.108 mm, D2=1.322 mm, D3=6.176 mm ||||||
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 13.144 | 0.724 | 1.636 | 23.972 | 16.394 |
| | Image-side surface 116 | -50.990 | 0.405 | | | |
| 1B lens element 12 | Object-side surface 125 | -22.173 | 0.494 | 1.640 | 23.529 | -43.881 |
| | Image-side surface 126 | -103.497 | 1.002 | | | |
| 1C lens element 13 | Object-side surface 135 | -15.558 | 0.494 | 1.671 | 19.243 | -27.706 |
| | Image-side surface 136 | -92.046 | D1 | | | |
| Aperture 0 | | Infinity | | | | |
| 2B lens element 22 | Object-side surface 225 | 26.879 | 0.494 | 1.671 | 19.243 | -23.703 |
| | Image-side surface 226 | 9.979 | 0.094 | | | |
| 2A lens element 21 | Object-side surface 215 | 6.492 | 2.343 | 1.531 | 55.745 | 6.153 |
| | Image-side surface 216 | -5.803 | D2 | | | |
| 3B lens element 32 | Object-side surface 325 | -19.458 | 1.762 | 1.671 | 19.243 | 19.756 |
| | Image-side surface 326 | -8.220 | 0.707 | | | |
| 3A lens element 31 | Object-side surface 315 | -111.902 | 0.494 | 1.536 | 55.981 | -5.718 |
| | Image-side surface 316 | 3.172 | D3 | | | |
| Filter 9 | Object-side surface 95 | Infinity | 0.210 | 1.517 | 64.167 | |
| | Image-side surface 96 | Infinity | 0.068 | | | |
| | Image plane 99 | Infinity | | | | |

FIG. 28

| Surface | K | $a_4$ | $a_6$ | $a_8$ |
|---|---|---|---|---|
| 115 | -1.703641E+01 | -1.163530E-03 | -2.057920E-04 | 3.503369E-05 |
| 116 | 1.346809E+01 | -1.459586E-03 | -8.046178E-05 | -1.957685E-05 |
| 125 | -4.349790E+00 | 3.580048E-04 | -2.068822E-04 | -3.256715E-05 |
| 126 | -2.192594E+01 | -1.757447E-03 | -2.233329E-04 | -1.569271E-05 |
| 135 | 1.507007E+01 | 6.771751E-05 | -1.718061E-05 | -1.098110E-05 |
| 136 | 1.366836E+02 | 7.899329E-04 | 2.497494E-05 | -7.514471E-05 |
| 225 | -6.254755E+01 | -2.675019E-03 | -1.303818E-04 | 2.456526E-05 |
| 226 | 7.576740E+00 | -2.496673E-03 | -2.579361E-04 | 3.687240E-05 |
| 215 | 1.584920E+00 | -8.502865E-04 | -2.689993E-04 | 2.117527E-05 |
| 216 | 1.178972E+00 | 1.054357E-03 | -3.689682E-07 | -3.017375E-07 |
| 325 | -6.352309E+01 | 3.287355E-03 | -2.652527E-04 | 6.974316E-05 |
| 326 | -1.847572E+01 | 6.415015E-03 | -1.518093E-03 | 3.909045E-04 |
| 315 | -1.265049E+03 | -1.818017E-02 | 1.042108E-03 | 6.874684E-04 |
| 316 | -5.276284E+00 | -1.322632E-02 | 2.927389E-03 | -3.432818E-04 |
| Surface | $a_{10}$ | $a_{12}$ | $a_{14}$ | $a_{16}$ |
| 115 | -1.165788E-05 | 1.869294E-06 | -1.389120E-07 | 4.134670E-09 |
| 116 | 2.859786E-06 | -7.817562E-08 | -5.387110E-10 | 0.000000E+00 |
| 125 | 7.318374E-06 | -8.958141E-07 | 4.409817E-08 | 0.000000E+00 |
| 126 | 2.777135E-06 | -3.756832E-07 | 2.722432E-08 | 0.000000E+00 |
| 135 | 1.481561E-06 | -5.260787E-08 | 2.789735E-08 | 0.000000E+00 |
| 136 | 2.738778E-05 | -4.631151E-06 | 3.198348E-07 | 0.000000E+00 |
| 225 | -3.906894E-06 | 2.086108E-07 | -5.237293E-09 | 0.000000E+00 |
| 226 | -3.941743E-06 | 1.134631E-07 | -1.094867E-09 | 0.000000E+00 |
| 215 | -1.673394E-06 | 2.443855E-08 | -1.742080E-10 | 0.000000E+00 |
| 216 | 1.523466E-07 | 1.350270E-08 | -1.541434E-09 | 0.000000E+00 |
| 325 | -1.701092E-05 | 3.029980E-06 | -2.530389E-07 | 8.070705E-09 |
| 326 | -7.628650E-05 | 9.056815E-06 | -3.205229E-07 | -2.631095E-09 |
| 315 | -3.435863E-04 | 6.957039E-05 | -6.174162E-06 | 1.943806E-07 |
| 316 | -6.080728E-06 | 7.320510E-06 | -6.768593E-07 | 1.498680E-08 |

FIG. 29

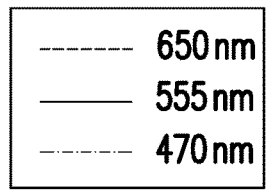
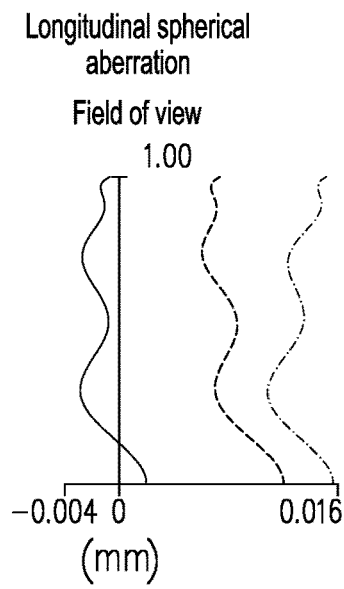
FIG. 31A
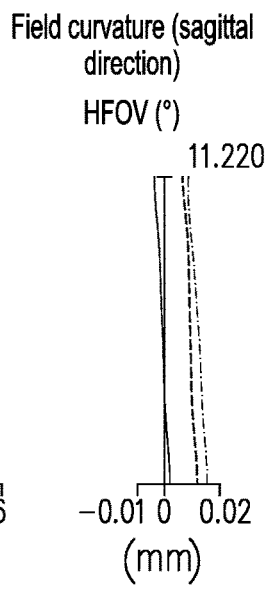
FIG. 31B
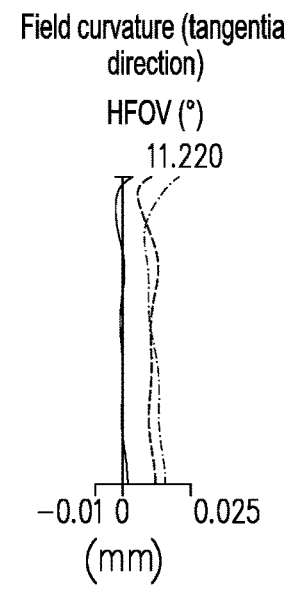
FIG. 31C
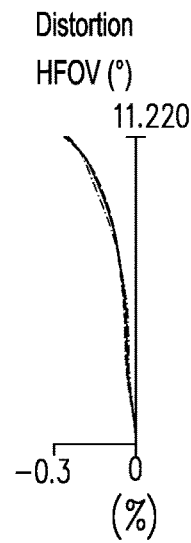
FIG. 31D
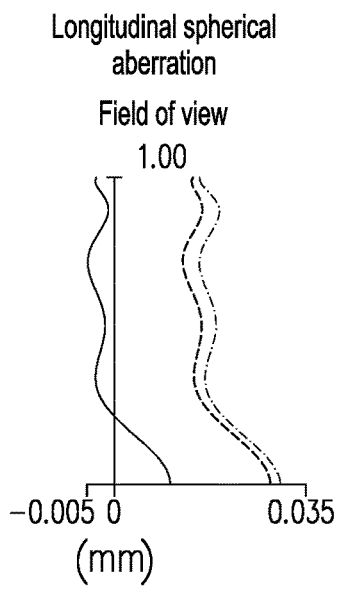
FIG. 31E
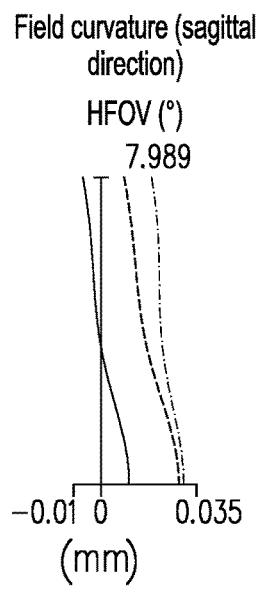
FIG. 31F
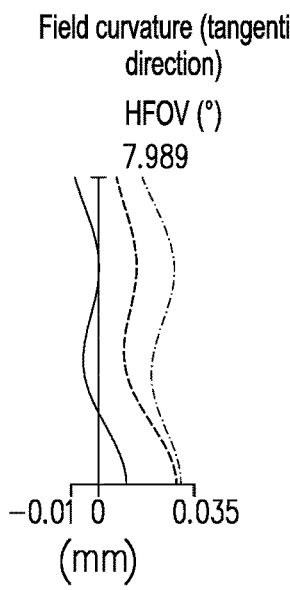
FIG. 31G
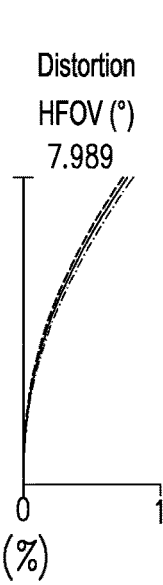
FIG. 31H

| Seventh embodiment |||||||
|---|---|---|---|---|---|---|
| EFL=3.100 mm, f1=195.312 mm, f2=10.847 mm, f3= -10.635 mm |||||||
| Short focus (wide angle) | EFL=15.671 mm, Fno=3.431, HFOV=11.220°, TL=22.543 mm, BFL=2.081 mm, D1=2.908 mm, D2=2.782 mm, D3=1.002 mm ||||||
| Long focus (telephoto) | EFL=21.939 mm, Fno=4.804, HFOV=7.989°, TL=17.070 mm, BFL=7.554 mm D1= 0.033 mm, D2=0.184 mm, D3=6.476 mm ||||||
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 13.202 | 0.436 | 1.615 | 25.920 | 21.044 |
| | Image-side surface 116 | -1000.000 | 0.020 | | | |
| 1B lens element 12 | Object-side surface 125 | 11.412 | 1.444 | 1.642 | 22.409 | -81.139 |
| | Image-side surface 126 | 8.909 | 1.952 | | | |
| 1C lens element 13 | Object-side surface 135 | -227.458 | 0.200 | 1.671 | 19.243 | -24.543 |
| | Image-side surface 136 | 17.947 | D1 | | | |
| Aperture 0 | | Infinity | | | | |
| 2C lens element 23 | Object-side surface 235 | 17.362 | 0.967 | 1.671 | 19.243 | -30.033 |
| | Image-side surface 236 | 9.158 | 0.034 | | | |
| 2B lens element 22 | Object-side surface 225 | 6.877 | 2.938 | 1.545 | 55.987 | 17.032 |
| | Image-side surface 226 | 22.378 | 0.462 | | | |
| 2A lens element 21 | Object-side surface 215 | 10.434 | 4.783 | 1.545 | 55.987 | 12.273 |
| | Image-side surface 216 | -15.719 | D2 | | | |
| 3B lens element 32 | Object-side surface 325 | -16.378 | 2.410 | 1.671 | 19.243 | 21.740 |
| | Image-side surface 326 | -8.216 | 0.256 | | | |
| 3A lens element 31 | Object-side surface 315 | -62.173 | 0.951 | 1.545 | 55.987 | -7.294 |
| | Image-side surface 316 | 4.280 | D3 | | | |
| Filter 9 | Object-side surface 95 | Infinity | 0.210 | 1.517 | 64.167 | |
| | Image-side surface 96 | Infinity | 0.868 | | | |
| | Image plane 99 | Infinity | | | | |

FIG. 32

| Surface | K | $a_4$ | $a_6$ | $a_8$ |
|---|---|---|---|---|
| 115 | -2.910878E+01 | -1.306290E-03 | -1.608659E-04 | 3.426745E-05 |
| 116 | -2.903611E-05 | -1.321982E-03 | -6.893692E-05 | -1.390509E-05 |
| 125 | 3.046172E+00 | 6.758185E-04 | -1.280373E-04 | -2.122148E-05 |
| 126 | 5.805826E-01 | -1.820827E-03 | -1.316975E-04 | -9.943595E-06 |
| 135 | -3.233414E-04 | -2.042378E-04 | -1.381840E-04 | -2.776723E-05 |
| 136 | -1.438923E-01 | 6.695056E-04 | -4.108238E-05 | -6.516427E-05 |
| 235 | 2.538037E+00 | -1.351427E-03 | 4.927842E-05 | 1.702475E-05 |
| 236 | 7.615569E+00 | -2.394060E-03 | -1.154217E-04 | 3.887682E-05 |
| 225 | 2.565890E+00 | 5.069785E-05 | -1.950450E-04 | 3.593836E-05 |
| 226 | 1.192286E-01 | 3.854456E-04 | 4.406427E-05 | 8.388394E-07 |
| 215 | -7.089773E+00 | -6.359188E-04 | 3.730732E-06 | 1.759225E-06 |
| 216 | 3.643915E+00 | -4.082782E-04 | -1.400515E-05 | 2.543908E-06 |
| 325 | -2.324061E-01 | 3.276319E-03 | -2.871114E-04 | 8.257657E-05 |
| 326 | 2.915004E+00 | 3.769514E-03 | -8.219346E-04 | 3.453186E-04 |
| 315 | 7.066646E-03 | -1.932536E-02 | 9.559837E-04 | 7.446243E-04 |
| 316 | -5.356653E+00 | -1.542236E-02 | 3.006921E-03 | -3.458840E-04 |
| Surface | $a_{10}$ | $a_{16}$ | $a_{18}$ | $a_{20}$ |
| 115 | -1.141267E-05 | 1.915442E-06 | -1.282791E-07 | 2.910928E-09 |
| 116 | 3.404072E-06 | -5.089315E-08 | -6.486388E-09 | 0.000000E+00 |
| 125 | 8.762131E-06 | -1.005556E-06 | 3.824879E-08 | 0.000000E+00 |
| 126 | 2.180813E-06 | -2.561128E-07 | 1.223008E-08 | 0.000000E+00 |
| 135 | 4.101914E-06 | -5.402033E-07 | 5.637602E-08 | 0.000000E+00 |
| 136 | 2.304766E-05 | -4.554001E-06 | 3.855922E-07 | 0.000000E+00 |
| 235 | -4.280038E-06 | 2.649116E-07 | 1.400000E-08 | 0.000000E+00 |
| 236 | -5.325304E-06 | 1.639161E-07 | 6.640729E-09 | 0.000000E+00 |
| 225 | -1.184959E-06 | -1.483518E-07 | 7.413828E-09 | 0.000000E+00 |
| 226 | 1.313323E-06 | 1.382998E-07 | 0.000000E+00 | 0.000000E+00 |
| 215 | 7.208468E-08 | 1.281145E-07 | 0.000000E+00 | 0.000000E+00 |
| 216 | -3.655357E-07 | 8.703001E-09 | 2.435955E-09 | 0.000000E+00 |
| 325 | -1.783311E-05 | 2.754682E-06 | -2.373348E-07 | 8.268106E-09 |
| 326 | -8.661245E-05 | 1.064697E-05 | -1.516863E-07 | -4.298379E-08 |
| 315 | -3.380668E-04 | 6.764342E-05 | -6.268970E-06 | 2.090258E-07 |
| 316 | -3.481733E-07 | 7.113125E-06 | -9.343771E-07 | 3.897840E-08 |

FIG. 33

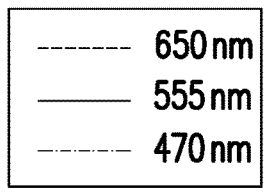
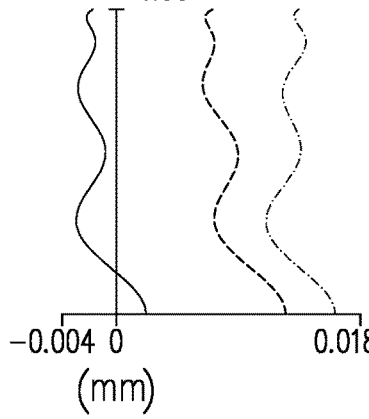 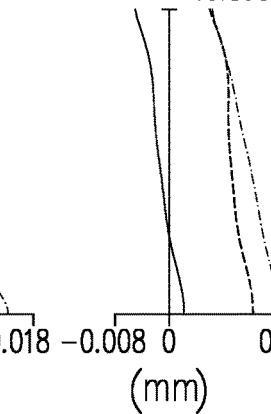 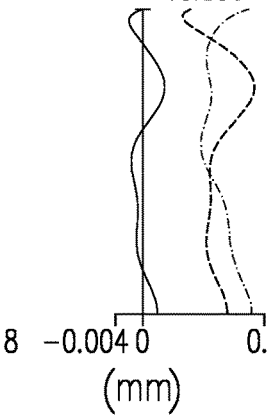 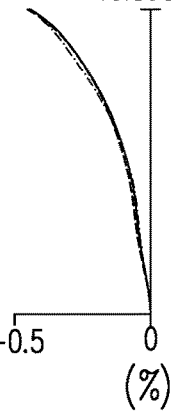
FIG. 35A  FIG. 35B  FIG. 35C  FIG. 35D
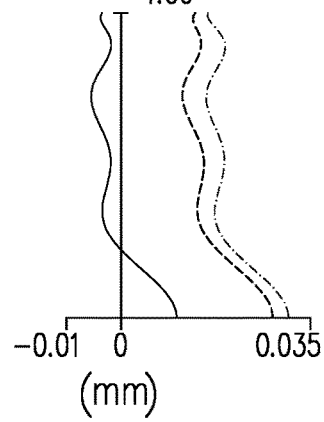 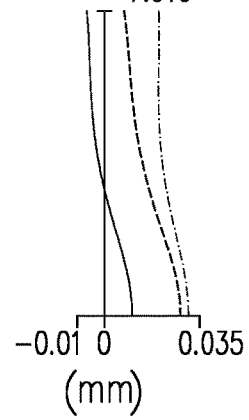 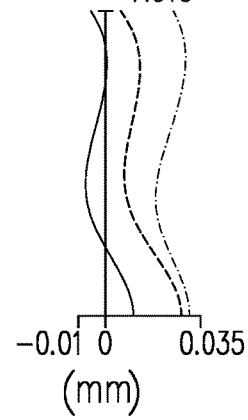 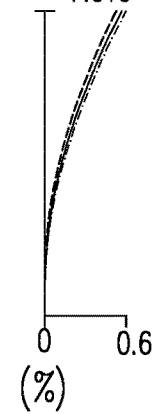
FIG. 35E  FIG. 35F  FIG. 35G  FIG. 35H

| Eighth embodiment | | | | | | |
|---|---|---|---|---|---|---|
| EFL=3.100 mm, f1=205.883 mm, f2=11.134 mm, f3= -10.812 mm | | | | | | |
| Short focus (wide angle) | EFL=16.189 mm, Fno=3.545, HFOV=10.890°, TL=23.292 mm, BFL=2.106 mm, D1=2.704 mm, D2=2.616 mm, D3=1.113 mm | | | | | |
| Long focus (telephoto) | EFL=19.196 mm, Fno=4.203, HFOV=7.910°, TL=20.754 mm, BFL=4.644 mm D1=1.602 mm, D2=1.180 mm, D3=3.650 mm | | | | | |
| Device | Surface | Radius of curvature (mm) | Thickness (mm) | Refractive index | Abbe number | Focal length (mm) |
| Object | | Infinity | Infinity | | | |
| 1A lens element 11 | Object-side surface 115 | 13.285 | 0.446 | 1.615 | 25.920 | 21.174 |
| | Image-side surface 116 | -1000.000 | 0.020 | | | |
| 1B lens element 12 | Object-side surface 125 | 11.244 | 1.501 | 1.642 | 22.409 | -79.057 |
| | Image-side surface 126 | 8.735 | 1.871 | | | |
| 1C lens element 13 | Object-side surface 135 | 627.334 | 0.331 | 1.671 | 19.243 | -24.565 |
| | Image-side surface 136 | 16.210 | D1 | | | |
| Aperture 0 | | Infinity | | | | |
| 2D lens element 24 | Object-side surface 245 | 17.271 | 1.121 | 1.671 | 19.243 | -31.314 |
| | Image-side surface 246 | 9.271 | 0.020 | | | |
| 2C lens element 23 | Object-side surface 235 | 6.993 | 3.575 | 1.545 | 55.987 | 17.487 |
| | Image-side surface 236 | 21.389 | 0.221 | | | |
| 2B lens element 22 | Object-side surface 225 | 10.388 | 2.987 | 1.545 | 55.987 | 67.234 |
| | Image-side surface 226 | 13.014 | 0.020 | | | |
| 2A lens element 21 | Object-side surface 215 | 12.838 | 2.201 | 1.545 | 55.987 | 13.382 |
| | Image-side surface 216 | -15.950 | D2 | | | |
| 3B lens element 32 | Object-side surface 325 | -16.697 | 2.499 | 1.671 | 19.243 | 21.608 |
| | Image-side surface 326 | -8.272 | 0.198 | | | |
| 3A lens element 31 | Object-side surface 315 | -64.547 | 0.962 | 1.545 | 55.987 | -7.382 |
| | Image-side surface 316 | 4.324 | D3 | | | |
| Filter 9 | Object-side surface 95 | Infinity | 0.210 | 1.517 | 64.167 | |
| | Image-side surface 96 | Infinity | 0.783 | | | |
| | Image plane 99 | Infinity | | | | |

FIG. 36

| Surface | K | $a_4$ | $a_6$ | $a_8$ |
|---|---|---|---|---|
| 115 | -2.932871E+01 | -1.311027E-03 | -1.609874E-04 | 3.421091E-05 |
| 116 | -2.603830E-05 | -1.312853E-03 | -6.949510E-05 | -1.386151E-05 |
| 125 | 3.129799E+00 | 6.832369E-04 | -1.256751E-04 | -2.115492E-05 |
| 126 | 5.753671E-01 | -1.816448E-03 | -1.381227E-04 | -1.027772E-05 |
| 135 | 1.830095E-05 | -2.044585E-04 | -1.365385E-04 | -2.753799E-05 |
| 136 | 1.508549E-01 | 6.774676E-04 | -3.366706E-05 | -6.393167E-05 |
| 245 | 2.956698E+00 | -1.327806E-03 | 4.285468E-05 | 1.609660E-05 |
| 246 | 7.611669E+00 | -2.389618E-03 | -1.165915E-04 | 3.838326E-05 |
| 235 | 2.565331E+00 | 5.154899E-05 | -1.944477E-04 | 3.577193E-05 |
| 236 | 1.075428E+00 | 4.152864E-04 | 4.384315E-05 | 7.373731E-07 |
| 225 | -7.439161E+00 | -6.688533E-04 | 4.832102E-06 | 2.394800E-06 |
| 226 | -3.496656E-01 | -2.090648E-05 | 2.512847E-06 | -1.802689E-07 |
| 215 | 3.675183E-01 | 2.082789E-05 | -2.566931E-06 | 1.887295E-07 |
| 216 | 4.236396E+00 | -4.684470E-04 | -1.369948E-05 | 2.338391E-06 |
| 325 | -8.212817E-01 | 3.307205E-03 | -2.897280E-04 | 8.289193E-05 |
| 326 | 2.806014E+00 | 3.807312E-03 | -8.176225E-04 | 3.439323E-04 |
| 315 | -5.208126E+01 | -1.929595E-02 | 9.609003E-04 | 7.437067E-04 |
| 316 | -5.468714E+00 | -1.553715E-02 | 3.012602E-03 | -3.460254E-04 |
| Surface | $a_{10}$ | $a_{16}$ | $a_{18}$ | $a_{20}$ |
| 115 | -1.141244E-05 | 1.915926E-06 | -1.281849E-07 | 2.903410E-09 |
| 116 | 3.412138E-06 | -5.035446E-08 | -6.537578E-09 | 0.000000E+00 |
| 125 | 8.763328E-06 | -1.006181E-06 | 3.824315E-08 | 0.000000E+00 |
| 126 | 2.171623E-06 | -2.559083E-07 | 1.248311E-08 | 0.000000E+00 |
| 135 | 4.162118E-06 | -5.567275E-07 | 5.146606E-08 | 0.000000E+00 |
| 136 | 2.302573E-05 | -4.579176E-06 | 3.840704E-07 | 0.000000E+00 |
| 245 | -4.165044E-06 | 3.023326E-07 | 9.420722E-09 | 0.000000E+00 |
| 246 | -5.246852E-06 | 1.919901E-07 | 8.556281E-09 | 0.000000E+00 |
| 235 | -1.331532E-06 | -1.610386E-07 | 1.237078E-08 | 0.000000E+00 |
| 236 | 1.344740E-06 | 1.393494E-07 | 0.000000E+00 | 0.000000E+00 |
| 225 | 1.852540E-07 | 1.502528E-07 | 0.000000E+00 | 0.000000E+00 |
| 226 | -6.722019E-08 | 0.000000E+00 | 0.000000E+00 | 0.000000E+00 |
| 215 | 0.000000E+00 | 0.000000E+00 | 0.000000E+00 | 0.000000E+00 |
| 216 | -3.335370E-07 | 1.909182E-08 | 1.041056E-09 | 0.000000E+00 |
| 325 | -1.784546E-05 | 2.736922E-06 | -2.392252E-07 | 8.743944E-09 |
| 326 | -8.689036E-05 | 1.066584E-05 | -1.463213E-07 | -4.287909E-08 |
| 315 | -3.382826E-04 | 6.758537E-05 | -6.268521E-06 | 2.111420E-07 |
| 316 | -4.820860E-07 | 7.111534E-06 | -9.330439E-07 | 3.896692E-08 |

FIG. 37

| Condition | First embodiment | | Second embodiment | | Third embodiment | |
|---|---|---|---|---|---|---|
| | Wide angle | Telephoto | Wide angle | Telephoto | Wide angle | Telephoto |
| TTL/Tmax | 10.887 | | 6.900 | | 5.722 | |
| V11+V12+V32 | 66.744 | | 97.388 | | 97.639 | |
| V12+V31+V32 | 99.195 | | 115.885 | | 134.383 | |
| V11+V31 | 79.952 | | 93.477 | | 78.396 | |
| (T11+G112+T12)/Tavg | 1.419 | | 1.423 | | 0.959 | |
| ALT/(Tmax+Tmin) | 3.233 | | 2.920 | | 3.068 | |
| TTL/Gmax | 7.902 | | 6.154 | | 6.762 | |
| (T11+T12)/T32 | 1.000 | | 0.690 | | 0.542 | |
| (T31+G312+T32)/Tmin | 6.000 | | 16.095 | | 17.922 | |
| TTL/Fno (mm) | 6.197 | 5.164 | 6.607 | 5.234 | 7.694 | 6.297 |
| (Gmax+BFL)/(T32+G312) | 2.599 | 3.161 | 2.210 | 2.852 | 1.775 | 2.237 |
| (EFL+ImgH)/Fno (mm) | 5.711 | 5.517 | 5.437 | 5.189 | 5.870 | 5.632 |
| (T11+G112)/T31 | 0.941 | 0.941 | 1.469 | 1.469 | 1.636 | 1.636 |
| TL/(Tmax+Tmin) | 6.000 | 4.963 | 5.463 | 4.415 | 4.630 | 3.896 |
| (Gmax+BFL)/Tavg | 6.581 | 8.005 | 4.700 | 6.068 | 3.542 | 4.466 |
| ALT/Gmax | 3.184 | 5.083 | 2.814 | 5.215 | 3.852 | 6.568 |
| (EFL+BFL)/Fno (mm) | 6.113 | 6.519 | 5.198 | 5.859 | 5.648 | 6.309 |
| TL/Tavg | 12.992 | 10.747 | 13.097 | 10.584 | 10.564 | 8.889 |
| T21/T22 | 1.381 | 1.381 | 2.920 | 2.920 | 16.000 | 16.000 |
| (T21+G212+T22)/T11 | 4.868 | 4.868 | 3.202 | 3.202 | 4.125 | 4.125 |
| T11/T12 | 0.972 | 0.972 | 2.847 | 2.847 | 2.087 | 2.087 |
| T32/T31 | 1.306 | 1.306 | 2.463 | 2.463 | 4.019 | 4.019 |
| V21+V22 | 74.997 | | 75.230 | | 75.230 | |
| V11+V21+V31 | 135.706 | | 149.464 | | 134.383 | |
| V12+V22+V32 | 62.015 | | 79.141 | | 94.473 | |
| ft/fw | 1.200 | | 1.262 | | 1.222 | |
| ΔEFL/ΔBFL | 1.136 | | 1.027 | | 0.965 | |
| ΔEFL (mm) | 2.428 | | 2.891 | | 2.408 | |

FIG. 38

| Condition | Fourth embodiment | | Fifth embodiment | | Sixth embodiment | |
|---|---|---|---|---|---|---|
| | Wide angle | Telephoto | Wide angle | Telephoto | Wide angle | Telephoto |
| TTL/Tmax | 5.319 | | 7.267 | | 7.641 | |
| V11+V12+V32 | 85.165 | | 85.165 | | 66.744 | |
| V12+V31+V32 | 103.657 | | 103.657 | | 99.195 | |
| V11+V31 | 84.414 | | 84.414 | | 79.952 | |
| (T11+G112+T12)/Tavg | 1.963 | | 1.347 | | 1.670 | |
| ALT/(Tmax+Tmin) | 2.723 | | 3.239 | | 2.399 | |
| TTL/Gmax | 7.755 | | 5.000 | | 5.000 | |
| (T11+T12)/T32 | 0.551 | | 1.000 | | 0.691 | |
| (T31+G312+T32)/Tmin | 25.588 | | 14.068 | | 6.000 | |
| TTL/Fno (mm) | 8.556 | 6.198 | 7.503 | 5.064 | 7.978 | 5.460 |
| (Gmax+BFL)/(T32+G312) | 1.388 | 1.619 | 3.281 | 4.531 | 2.150 | 3.150 |
| (EFL+ImgH)/Fno (mm) | 5.909 | 5.550 | 5.472 | 5.000 | 5.936 | 5.500 |
| (T11+G112)/T31 | 2.401 | 2.401 | 0.970 | 0.970 | 2.287 | 2.287 |
| TL/(Tmax+Tmin) | 4.361 | 4.086 | 5.841 | 4.173 | 5.701 | 4.033 |
| (Gmax+BFL)/Tavg | 3.462 | 4.038 | 4.693 | 6.480 | 5.461 | 8.000 |
| ALT/Gmax | 4.177 | 4.528 | 2.426 | 7.936 | 1.900 | 5.148 |
| (EFL+BFL)/Fno (mm) | 5.786 | 5.797 | 4.999 | 5.998 | 5.325 | 6.524 |
| TL/Tavg | 11.211 | 10.506 | 12.622 | 9.017 | 16.638 | 11.771 |
| T21/T22 | 0.123 | 0.123 | 6.842 | 6.842 | 4.745 | 4.745 |
| (T21+G212+T22)/T11 | 1.917 | 1.917 | 1.955 | 1.955 | 4.048 | 4.048 |
| T11/T12 | 9.577 | 9.577 | 2.802 | 2.802 | 1.466 | 1.466 |
| T32/T31 | 3.197 | 3.197 | 1.259 | 1.259 | 3.569 | 3.569 |
| V21+V22 | 75.224 | | 75.224 | | 74.988 | |
| V11+V21+V31 | 103.657 | | 140.394 | | 135.698 | |
| V12+V22+V32 | 112.713 | | 75.975 | | 62.015 | |
| ft/fw | 1.380 | | 1.500 | | 1.461 | |
| ΔEFL/ΔBFL | 3.769 | | 1.031 | | 0.996 | |
| ΔEFL (mm) | 4.181 | | 4.459 | | 4.709 | |

FIG. 39

| Condition | Seventh embodiment | | Eighth embodiment | |
|---|---|---|---|---|
| | Wide angle | Telephoto | Wide angle | Telephoto |
| TTL/Tmax | 5.148 | | 7.105 | |
| V11+V12+V32 | 67.572 | | 67.572 | |
| V12+V31+V32 | 101.150 | | 101.150 | |
| V11+V31 | 81.907 | | 81.907 | |
| (T11+G112+T12)/Tavg | 1.076 | | 1.133 | |
| ALT/(Tmax+Tmin) | 2.835 | | 4.000 | |
| TTL/Gmax | 8.469 | | 9.392 | |
| (T11+T12)/T32 | 0.780 | | 0.779 | |
| (T31+G312+T32)/Tmin | 18.085 | | 11.051 | |
| TTL/Fno (mm) | 7.177 | 5.126 | 7.164 | 6.043 |
| (Gmax+BFL)/(T32+G312) | 1.871 | 3.566 | 1.784 | 2.416 |
| (EFL+ImgH)/Fno (mm) | 5.471 | 5.212 | 5.441 | 5.305 |
| (T11+G112)/T31 | 0.479 | 0.479 | 0.484 | 0.484 |
| TL/(Tmax+Tmin) | 4.524 | 3.426 | 5.963 | 5.314 |
| (Gmax+BFL)/Tavg | 2.824 | 5.383 | 2.771 | 3.753 |
| ALT/Gmax | 4.859 | 7.237 | 5.777 | 8.351 |
| (EFL+BFL)/Fno (mm) | 5.174 | 6.139 | 5.161 | 5.672 |
| TL/Tavg | 12.764 | 9.665 | 13.418 | 11.956 |
| T21/T22 | 1.628 | 1.628 | 0.737 | 0.737 |
| (T21+G212+T22)/T11 | 18.775 | 18.775 | 11.677 | 11.677 |
| T11/T12 | 0.302 | 0.302 | 0.297 | 0.297 |
| T32/T31 | 2.533 | 2.533 | 2.598 | 2.598 |
| V21+V22 | 111.974 | | 111.974 | |
| V11+V21+V31 | 137.894 | | 137.894 | |
| V12+V22+V32 | 97.639 | | 97.639 | |
| ft/fw | 1.400 | | 1.186 | |
| ΔEFL/ΔBFL | 1.145 | | 1.185 | |
| ΔEFL (mm) | 6.268 | | 3.007 | |

FIG. 40

OPTICAL IMAGING LENS

CROSS-REFERENCE TO RELATED APPLICATION

This application claims the priority benefit of China application no. 202210098690.3, filed on Jan. 27, 2022. The entirety of the above-mentioned patent application is hereby incorporated by reference herein and made a part of this specification.

BACKGROUND OF THE INVENTION

Field of the Invention

The invention relates to an optical device, and in particular relates to an optical imaging lens.

Description of Related Art

In recent years, optical imaging lenses are continuously evolving and have acquired a wider range of applications. In addition to requiring the lens to be lightweight and compact, the design of a small f-number (Fno) is conducive to increasing luminous influx, and a large field of view has gradually become a trend. Moreover, the demand for video recording of portable electronic products is also increasing day by day. Optical zoom using a single zoom lens or digital zoom combined with a plurality of fixed-focus lenses may meet different imaging needs. However, in an imaging system formed by a plurality of fixed-focus lenses, in addition to the arrangement of the plurality of lenses taking up more space, when adjusting the focal length during imaging, image resolution or field of view may also be discontinuous due to the different lenses. Therefore, how to design an optical imaging lens that is lightweight and compact and has a zoom effect has become an urgent issue to be solved.

SUMMARY OF THE INVENTION

The invention provides an optical imaging lens having small f-number, small volume, and may maintain good optical quality during zooming.

The invention provides an optical imaging lens including a first lens element group, a second lens element group, and a third lens element group in sequence along an optical axis from an object side to an image side, and lens elements in the first lens element group to the third lens element group each include an object-side surface facing the object side and allowing an imaging ray to pass through and an image-side surface facing the image side and allowing the imaging ray to pass through. The first lens element group includes at least one lens element. A lens element in a first order of the first lens element group counted from the object side is a 1A lens element. The 1A lens element has positive refracting power, and an optical axis region of the object-side surface of the 1A lens element is convex. The second lens element group includes at least two lens elements. The third lens element group includes at least two lens elements. A lens element in a first order of the third lens element group counted from the image side is a 3A lens element. An optical axis region of the image-side surface of the 3A lens element is concave. A lens element in a second order of the third lens element group counted from the image side is a 3B lens element. An optical axis region of the object-side surface of the 3B lens element is concave and a periphery region of the object-side surface of the 3B lens element is convex. In particular, when the optical imaging lens is zoomed, at least one lens element group is moved toward a direction of the object side or a direction of the image side along the optical axis.

The invention further provides an optical imaging lens including a first lens element group, a second lens element group, and a third lens element group in sequence along an optical axis from an object side to an image side, and lens elements in the first lens element group to the third lens element group each include an object-side surface facing the object side and allowing an imaging ray to pass through and an image-side surface facing the image side and allowing the imaging ray to pass through. The first lens element group includes at least one lens element. A lens element in a first order of the first lens element group counted from the object side is a 1A lens element. An optical axis region of the object-side surface of the 1A lens element is convex and a periphery region of the object-side surface of the 1A lens element is concave. The second lens element group includes at least two lens elements. The third lens element group includes at least two lens elements. A lens element in a first order of the third lens element group counted from the image side is a 3A lens element. An optical axis region of the image-side surface of the 3A lens element is concave. A lens element in a second order of the third lens element group counted from the image side is a 3B lens element. The 3B lens element has positive refracting power, and an optical axis region of the object-side surface of the 3B lens element is concave. In particular, a distance from the object-side surface of the 1A lens element to an image plane on the optical axis divided by a maximum value of the thicknesses of all of the lens elements in the first lens element group to the third lens element group on the optical axis is less than or equal to 14.000. When the optical imaging lens is zoomed, at least one lens element group is moved toward a direction of the object side or a direction of the image side along the optical axis.

The invention further provides an optical imaging lens including a first lens element group, a second lens element group, and a third lens element group in sequence along an optical axis from an object side to an image side, and lens elements in the first lens element group to the third lens element group each include an object-side surface facing the object side and allowing an imaging ray to pass through and an image-side surface facing the image side and allowing the imaging ray to pass through. The first lens element group includes at least one lens element. A lens element in a first order of the first lens element group counted from the object side is a 1A lens element. An optical axis region of the image-side surface of the 1A lens element is convex and a periphery region of the image-side surface of the 1A lens element is convex. The second lens element group includes at least two lens elements. The third lens element group includes at least two lens elements. A lens element in a first order of the third lens element group counted from the image side is a 3A lens element. An optical axis region of the image-side surface of the 3A lens element is concave. A lens element in a second order of the third lens element group counted from the image side is a 3B lens element. An optical axis region of the object-side surface of the 3B lens element is concave and an optical axis region of the image-side surface of the 3B lens element is convex. In particular, a distance from the object-side surface of the 1A lens element to an image plane on the optical axis divided by a maximum value of the thicknesses of all of the lens elements in the first lens element group to the third lens element group on the optical axis is less than or equal to 14.000. When the optical imaging lens is zoomed, at least one lens element group is moved toward a direction of the object side or a direction of the image side along the optical axis.

Based on the above, the beneficial effects of the optical imaging lens of an embodiment of the invention are: by satisfying the concave-convex surface arrangement design of the above lens elements, the conditions of refracting power, and the design of adjustable air gap, the optical imaging lens has a smaller f-number and a smaller volume, and the optical imaging lens may still maintain good optical quality during the zooming process.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic illustrating the surface structure of a lens element of Example 1.

FIG. 4 is a schematic illustrating the surface structure of a lens element of Example 2.

FIG. 5 is a schematic illustrating the surface structure of a lens element of Example 3.

FIG. 7A to FIG. 7H are diagrams of the longitudinal spherical aberration and various aberrations of the optical imaging lens of the first embodiment.

FIG. 8 shows detailed optical data of the optical imaging lens of the first embodiment of the invention.

FIG. 9 shows aspheric surface parameters of the optical imaging lens of the first embodiment of the invention.

FIG. 11A to FIG. 11H are diagrams of the longitudinal spherical aberration and various aberrations of the optical imaging lens of the second embodiment.

FIG. 12 shows detailed optical data of the optical imaging lens of the second embodiment of the invention.

FIG. 13 shows aspheric surface parameters of the optical imaging lens of the second embodiment of the invention.

FIG. 15A to FIG. 15H are diagrams of the longitudinal spherical aberration and various aberrations of the optical imaging lens of the third embodiment.

FIG. 16 shows detailed optical data of the optical imaging lens of the third embodiment of the invention.

FIG. 17 shows aspheric surface parameters of the optical imaging lens of the third embodiment of the invention.

FIG. 19A to FIG. 19H are diagrams of the longitudinal spherical aberration and various aberrations of the optical imaging lens of the fourth embodiment.

FIG. 20 shows detailed optical data of the optical imaging lens of the fourth embodiment of the invention.

FIG. 21 shows aspheric surface parameters of the optical imaging lens of the fourth embodiment of the invention.

FIG. 23A to FIG. 23H are diagrams of the longitudinal spherical aberration and various aberrations of the optical imaging lens of the fifth embodiment.

FIG. 24 shows detailed optical data of the optical imaging lens of the fifth embodiment of the invention.

FIG. 25 shows aspheric surface parameters of the optical imaging lens of the fifth embodiment of the invention.

FIG. 27A to FIG. 27H are diagrams of the longitudinal spherical aberration and various aberrations of the optical imaging lens of the sixth embodiment.

FIG. 28 shows detailed optical data of the optical imaging lens of the sixth embodiment of the invention.

FIG. 29 shows aspheric surface parameters of the optical imaging lens of the sixth embodiment of the invention.

FIG. 31A to FIG. 31H are diagrams of the longitudinal spherical aberration and various aberrations of the optical imaging lens of the seventh embodiment.

FIG. 32 shows detailed optical data of the optical imaging lens of the seventh embodiment of the invention.

FIG. 33 shows aspheric surface parameters of the optical imaging lens of the seventh embodiment of the invention.

FIG. 35A to FIG. 35H are diagrams of the longitudinal spherical aberration and various aberrations of the optical imaging lens of the eighth embodiment.

FIG. 36 shows detailed optical data of the optical imaging lens of the eighth embodiment of the invention.

FIG. 37 shows aspheric surface parameters of the optical imaging lens of the eighth embodiment of the invention.

FIG. 38 shows the numerical values of the relational formulas of various important parameters of the optical imaging lenses of the first to third embodiments of the invention.

FIG. 39 shows the numerical values of the relational formulas of various important parameters of the optical imaging lenses of the fourth to sixth embodiments of the invention.

FIG. 40 shows the numerical values of the relational formulas of various important parameters of the optical imaging lenses of the seventh to eighth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
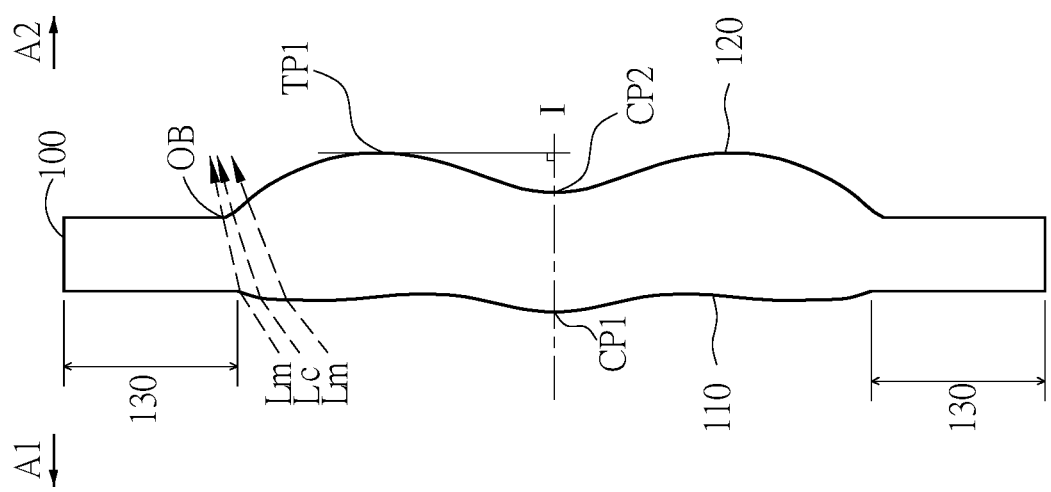
FIG. 1 is a schematic illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
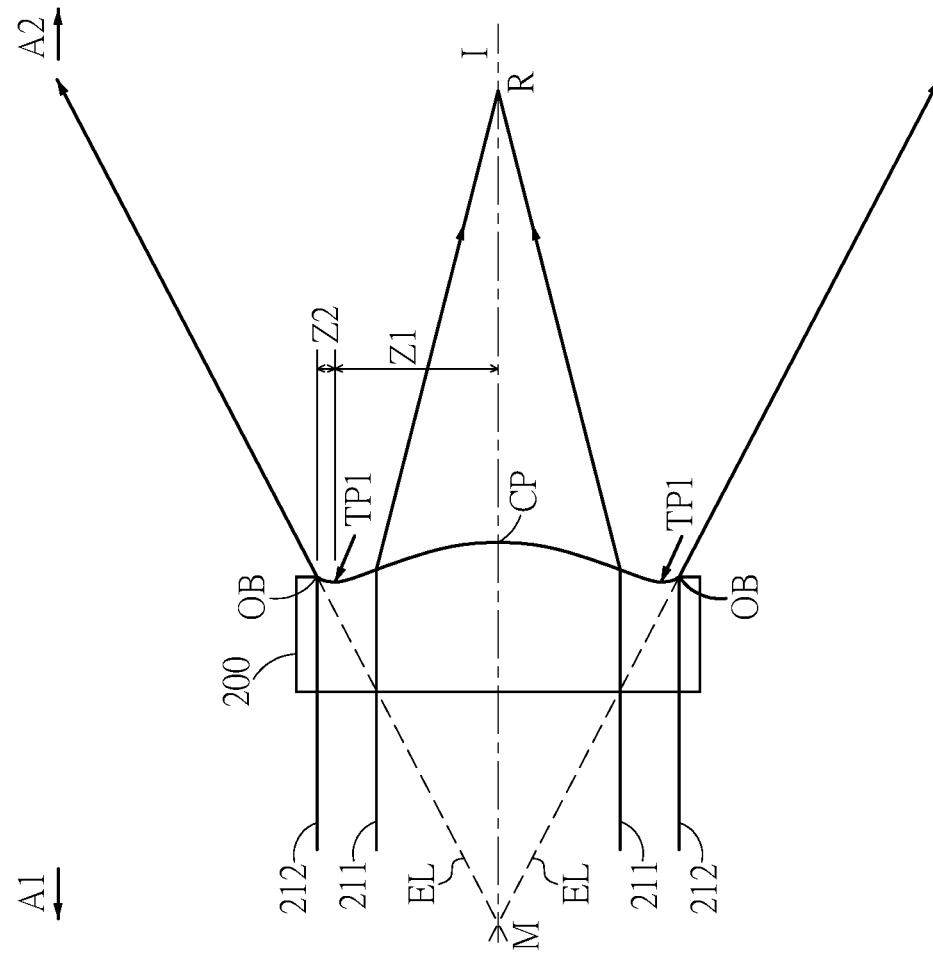
FIG. 2 is a schematic illustrating the surface concave and convex structure of a lens and the intersection of light rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
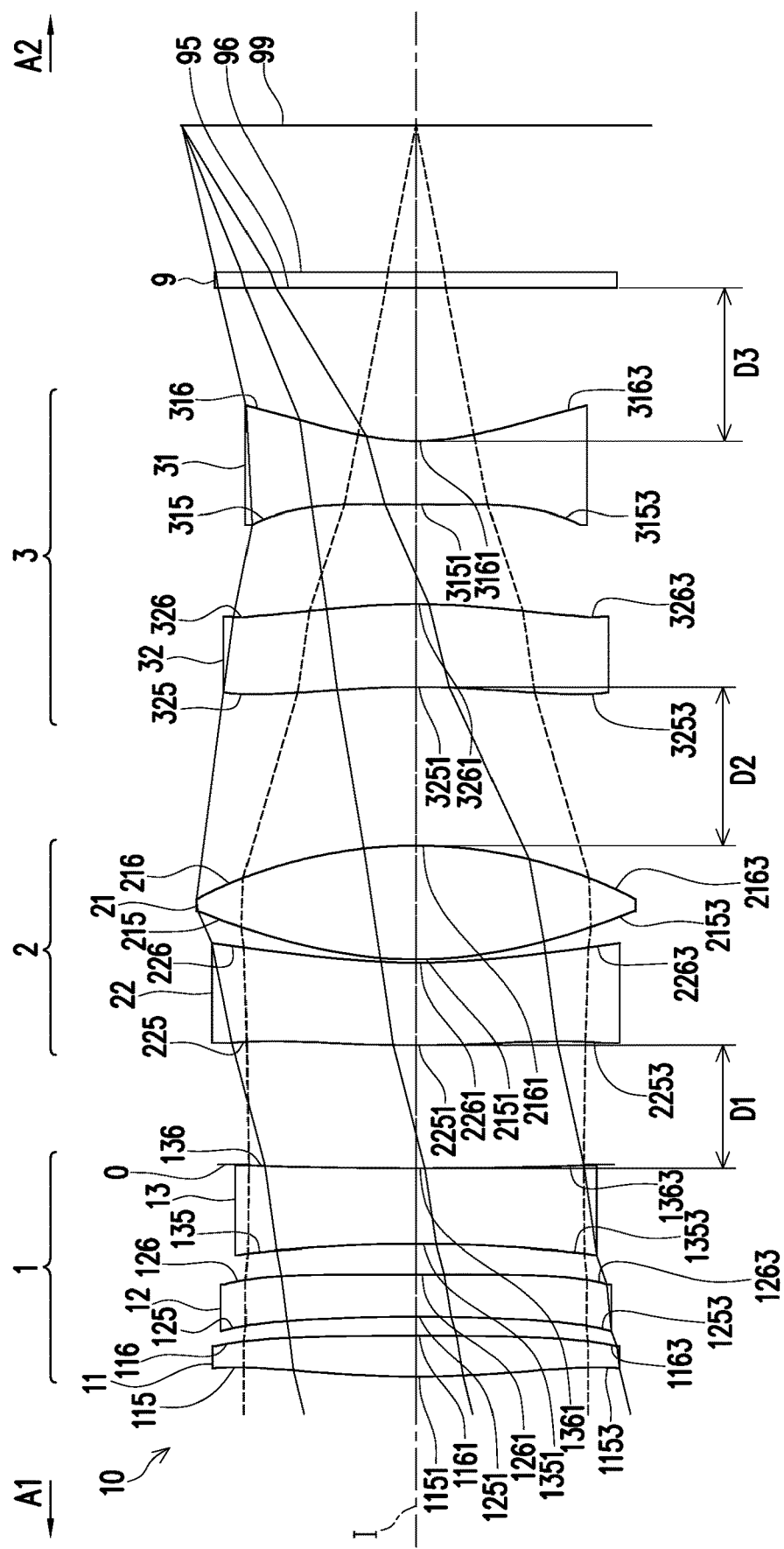
FIG. 6 is a schematic of the optical imaging lens of the first embodiment of the invention.

FIG. 6 is a schematic of the optical imaging lens of the first embodiment of the invention. FIG. 7A to FIG. 7H are diagrams of the longitudinal spherical aberration and various aberrations of the optical imaging lens of the first embodiment. Referring first to FIG. 6, the optical imaging lens 10 of the first embodiment of the invention includes, sequentially counted from the object side A1 to the image side A2 along the optical axis I of the optical imaging lens 10, a first lens element group 1, an aperture 0, a second lens element group 2, a third lens element group 3, and a filter 9. In particular, the first lens element group 1 includes a 1A lens element 11, a 1B lens element 12, and a 1C lens element 13 in sequence along the optical axis I counted from the object side A1 to the image side A2. The second lens element group 2 includes a 2A lens element 21 and a 2B lens element 22 in sequence along the optical axis I counted from the image side A2 to the object side A1. The third lens element group 3 includes a 3A lens element 31 and a 3B lens element 32 in sequence along the optical axis I counted from the image side A2 to the object side A1. In particular, the "1A, 1B, 2A . . . " of 1A lens element, 1B lens element, 2A lens element . . . etc. are used to name the lens elements to distinguish the lens elements of different lens element groups. When rays emitted by an object to be imaged enter the optical imaging lens 10 and pass through the first lens element group 1, the aperture 0, the second lens element group 2, the third lens element group 3, and the filter 9, an image is formed on an image plane 99. The filter 9 is disposed between an image-side surface 316 of the 3A lens element 31 and the image plane 99. It should be added that, the object side A1 is a side facing the object to be imaged and the image side A2 is a side facing the image plane 99. In the present embodiment, the filter 9 is an IR cut filter.

In the present embodiment, the 1A lens element 11, the 1B lens element 12, the 1C lens element 13, the 2B lens element 22, the 2A lens element 21, the 3B lens element 32, the 3A lens element 31, and the filter 9 each have an object-side surface 115, 125, 135, 225, 215, 325, 315, and 95 facing the object side A1 and allowing an imaging ray to pass through and an image-side surface 116, 126, 136, 226, 216, 326, 316, and 96 facing the image side A2 and allowing the imaging ray to pass through. In the present embodiment, the aperture 0 is placed between the first lens element group 1 and the second lens element group 2.

The 1A lens element 11 is a lens element in a first order of the first lens element group 1 counted from the object side A1. The 1A lens element 11 has positive refracting power. An optical axis region 1151 of the object-side surface 115 of the 1A lens element 11 is convex, and a periphery region 1153 thereof is concave. An optical axis region 1161 of the image-side surface 116 of the 1A lens element 11 is convex, and a periphery region 1163 thereof is convex. In the present embodiment, the object-side surface 115 and the image-side surface 116 of the 1A lens element 11 are both aspheric surfaces, but the invention is not limited thereto.

The 1B lens element 12 is a lens element in a second order of the first lens element group 1 counted from the object side A1. The 1B lens element 12 has negative refracting power. An optical axis region 1251 of the object-side surface 125 of the 1B lens element 12 is concave, and a periphery region 1253 thereof is concave. An optical axis region 1261 of the image-side surface 126 of the 1B lens element 12 is concave, and a periphery region 1263 thereof is convex. In the present embodiment, the object-side surface 125 and the image-side surface 126 of the 1B lens element 12 are both aspheric surfaces, but the invention is not limited thereto.

The 1C lens element 13 is a lens element in a third order of the first lens element group 1 counted from the object side A1. The 1C lens element 13 has negative refracting power. An optical axis region 1351 of the object-side surface 135 of the 1C lens element 13 is concave, and a periphery region 1353 thereof is concave. An optical axis region 1361 of the image-side surface 136 of the 1C lens element 13 is concave, and a periphery region 1363 thereof is concave. In the present embodiment, the object-side surface 135 and the image-side surface 136 of the 1C lens element 13 are both aspheric surfaces, but the invention is not limited thereto.

The 2B lens element 22 is a lens element in a second order of the second lens element group 2 counted from the image side A2. The 2B lens element 22 has negative refracting power. An optical axis region 2251 of the object-side surface 225 of the 2B lens element 22 is convex, and a periphery region 2253 thereof is concave. An optical axis region 2261 of the image-side surface 226 of the 2B lens element 22 is concave, and a periphery region 2263 thereof is concave. In the present embodiment, the object-side surface 225 and the image-side surface 226 of the 2B lens element 22 are both aspheric surfaces, but the invention is not limited thereto.

The 2A lens element 21 is a lens element in a first order of the second lens element group 2 counted from the image side A2. The 2A lens element 21 has positive refracting power. An optical axis region 2151 of the object-side surface 215 of the 2A lens element 21 is convex, and a periphery region 2153 thereof is convex. An optical axis region 2161 of the image-side surface 216 of the 2A lens element 21 is convex, and a periphery region 2163 thereof is convex. In the present embodiment, the object-side surface 215 and the image-side surface 216 of the 2A lens element 21 are both aspheric surfaces, but the invention is not limited thereto.

The 3B lens element 32 is a lens element in a second order of the third lens element group 3 counted from the image side A2. The 3B lens element 32 has positive refracting power. An optical axis region 3251 of the object-side surface 325 of the 3B lens element 32 is concave, and a periphery region 3253 thereof is convex. An optical axis region 3261 of the image-side surface 326 of the 3B lens element 32 is convex, and a periphery region 3263 thereof is concave. In the present embodiment, the object-side surface 325 and the image-side surface 326 of the 3B lens element 32 are both aspheric surfaces, but the invention is not limited thereto.

The 3A lens element 31 is a lens element in a first order of the third lens element group 3 counted from the image side A2. The 3A lens element 31 has negative refracting power. An optical axis region 3151 of the object-side surface 315 of the 3A lens element 31 is convex, and a periphery region 3153 thereof is concave. An optical axis region 3161 of the image-side surface 316 of the 3A lens element 31 is concave, and a periphery region 3163 thereof is concave. In the present embodiment, the object-side surface 315 and the image-side surface 316 of the 3A lens element 31 are both aspheric surfaces, but the invention is not limited thereto.

In the present embodiment, the number of lens elements of the optical imaging lens 10 is seven. Moreover, the optical imaging lens 10 is a zoom lens, the first lens element group 1 has negative refracting power, the second lens element group 2 has positive refracting power, the third lens element group 3 has negative refracting power, and an air gap AG12 between the first lens element group 1 and the second lens element group 2 on the optical axis I is an adjustable air gap D1, an air gap AG23 between the second lens element group 2 and the third lens element group 3 on the optical axis I is an adjustable air gap D2, and an air gap AG3F between the third lens element group 3 and the filter 9 on the optical axis I is an adjustable air gap D3. Therefore, by changing the distances of the adjustable air gaps D1, D2, and D3 in the optical imaging lens 10, the optical imaging lens 10 may always form a clear image in the effective focal length (EFL) range of 12.143 mm (millimeter) to 14.571 mm.

Other detailed optical data of the first embodiment are shown in FIG. 8. When the adjustable air gaps D1, D2, and D3 of the optical imaging lens 10 of the first embodiment are 1.629 mm, 2.093 mm, and 2.026 mm, respectively, the optical imaging lens 10 is in short focus (wide angle) mode, and has an EFL of 12.143 mm, an f-number (Fno) of 2.669, and an HFOV of 13.839 degrees. The distance from the object-side surface 115 of the 1A lens element 11 to the image-side surface 316 of the 3A lens element 31 on the optical axis I (TL in FIG. 8) is 12.368 mm, and the distance from the image-side surface 316 of the 3A lens element 31 to the image plane 99 on the optical axis I (BFL in FIG. 8) is 4.172 mm. Moreover, when the adjustable air gaps D1, D2, and D3 of the optical imaging lens 10 of the first embodiment are 0.273 mm, 1.311 mm, and 4.164 mm, respectively, the optical imaging lens 10 is in long focus (telephoto) mode, and has an EFL of 14.571 mm, an Fno of 3.203, and an HFOV of 11.655 degrees. Moreover, the distance from the object-side surface 115 of the 1A lens element 11 to the image-side surface 316 of the 3A lens element 31 on the optical axis I is 10.230 mm, and the distance from the image-side surface 316 of the 3A lens element 31 to the image plane 99 on the optical axis I is 6.310 mm.

Moreover, in the present embodiment, the fourteen surfaces in total of the 1A lens element 11, the 1B lens element 12, the 1C lens element 13, the 2B lens element 22, the 2A lens element 21, the 3B lens element 32, and the 3A lens element 31, i.e., the object-side surfaces 115, 125, 135, 225, 215, 325, 315 and the image-side surfaces 116, 126, 136, 226, 216, 326, 316 are all aspherical surfaces, wherein the object-side surfaces 115, 125, 135, 225, 215, 325, 315 and the image-side surfaces 116, 126, 136, 226, 216, 326, 316 are general even aspheric surfaces. And these aspheric surfaces are defined according to the following general formula (1):

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

wherein:
R: radius of curvature of the lens element surface near the optical axis I;
Z: depth of aspheric surface (vertical distance between the point on the aspheric surface for which the distance from the optical axis I is Y and the cross section tangent to the vertex on the aspheric surface optical axis I);
Y: vertical distance between a point on the aspheric surface curve and the optical axis I;
K: conic constant;
$a_i$: i-th aspheric surface coefficient.

Each of the aspheric coefficients of the object-side surface 115 of the 1A lens element 11 to the image-side surface 316 of the 3A lens element 31 in general formula (1) is as shown in FIG. 9. In particular, field number 115 in FIG. 9 represents the aspheric coefficient of the object-side surface 115 of the 1A lens element 11, and the other fields are defined in a similar manner. In the present embodiment and the following embodiments, the second-order aspheric coefficients $a_2$ are all zero.

Moreover, the relationship between each of the important parameters in the optical imaging lens 10 of the first embodiment is as shown in FIG. 38.

The definition of each important parameter in the optical imaging lens 10 of each embodiment is described below,
T11 is the thickness of a lens element in a first order (i.e., the 1A lens element 11) of the first lens element group 1 counted from the object side A1 on the optical axis I;

T12 is the thickness of a lens element in a second order (i.e., the 1B lens element 12) of the first lens element group 1 counted from the object side A1 on the optical axis I;

T13 is the thickness of a lens element in a third order (i.e., the 1C lens element 13) of the first lens element group 1 counted from the object side A1 on the optical axis I;

T21 is the thickness of a lens element in a first order (i.e., the 2A lens element 21) of the second lens element group 2 counted from the image side A2 on the optical axis I;

T22 is the thickness of a lens element in a second order (i.e., the 2B lens element 22) of the second lens element group 2 counted from the image side A2 on the optical axis I;

T23 is the thickness of a lens element in a third order (i.e., the 2C lens element 23) of the second lens element group 2 counted from the image side A2 on the optical axis I;

T24 is the thickness of a lens element in a fourth order (i.e., the 2D lens element 24) of the second lens element group 2 counted from the image side A2 on the optical axis I;

T31 is the thickness of a lens element in a first order (i.e., the 3A lens element 31) of the third lens element group 3 counted from the image side A2 on the optical axis I;

T32 is the thickness of a lens element in a second order (i.e., the 3B lens element 32) of the third lens element group 3 counted from the image side A2 on the optical axis I; T33 is the thickness of a lens element in a third order (i.e., the 3C lens element 33) of the third lens element group 3 counted from the image side A2 on the optical axis I;

AG12 is the air gap between the first lens element group 1 and the second lens element group 2 on the optical axis I; AG23 is the air gap between the second lens element group 2 and the third lens element group 3 on the optical axis I;

AG3F is the air gap between the third lens element group 3 and the filter 9 on the optical axis I;

G112 is the air gap between the 1A lens element 11 and the 1B lens element 12 on the optical axis I;

G123 is the air gap between the 1B lens element 12 and the 1C lens element 13 on the optical axis I;

G212 is the air gap between the 2A lens element 21 and the 2B lens element 22 on the optical axis I;

G223 is the air gap between the 2B lens element 22 and the 2C lens element 23 on the optical axis I;

G234 is the air gap between the 2C lens element 23 and the 2D lens element 24 on the optical axis I; G312 is the air gap between the 3A lens element 31 and the 3B lens element 32 on the optical axis I;

G323 is the air gap between the 3B lens element 32 and the 3C lens element 33 on the optical axis I;

AAG is the sum of the air gaps on the optical axis I of all of the lens elements in the first lens element group 1 to the third lens element group 3;

ALT is the sum of the thicknesses of all of the lens elements in the first lens element group 1 to the third lens element group 3 on the optical axis I;

TL is the distance from the object-side surface 115 of the 1A lens element 11 to the image-side surface 316 of the 3A lens element 31 on the optical axis I; TTL is the distance from the object-side surface 115 of the 1A lens element 11 to the image plane 99 on the optical axis I, that is, the system length of the optical imaging lens 10;

BFL is the distance from the image-side surface 316 of the 3A lens element 31 to the image plane 99 on the optical axis I; EFL is the effective focal length of the optical imaging lens 10;

ft is the effective focal length of the optical imaging lens 10 in long focus (or telephoto) mode;

fw is the effective focal length of the optical imaging lens 10 in short focus (or wide angle) mode;

HFOV is the half angle of view of the optical imaging lens 10;

ImgH is the image height of the optical imaging lens 10; and

Fno is the f-number of the optical imaging lens 10.

Moreover, the following are further defined:

TF is the thickness of the filter 9 on the optical axis I;

GFP is the air gap of the filter 9 and the image plane 99 on the optical axis I;

Tavg is the average value of the thicknesses of all of the lens elements in the first lens element group 1 to the third lens element group 3 on the optical axis I;

Tmax is the maximum value of the thicknesses of all of the lens elements in the first lens element group 1 to the third lens element group 3 on the optical axis I;

Tmin is the minimum value of the thicknesses of all of the lens elements in the first lens element group 1 to the third lens element group 3 on the optical axis I;

Gmax is the maximum value of the air gaps of all of the lens elements in the first lens element group 1 to the third lens element group 3 on the optical axis I;

$BFL_t$ is the distance from the image-side surface 316 of the 3A lens element 31 to the image plane 99 on the optical axis I when the optical imaging lens 10 is in telephoto mode, that is, the back focal length of the optical imaging lens 10 in telephoto mode;

$BFL_w$ is the distance from the image-side surface 316 of the 3A lens element 31 to the image plane 99 on the optical axis I when the optical imaging lens 10 is in short focus mode, that is, the back focal length of the optical imaging lens 10 in short focus mode;

ΔBFL is the variation of the back focal length of the optical imaging lens 10 in telephoto mode and short focus mode, that is, the difference between $BFL_t$ and $BFL_w$;

$AAG_t$ is the sum of the air gaps of all of the lens elements on the optical axis I when the optical imaging lens 10 is in telephoto mode;

$AAG_w$ is the sum of the air gaps of all of the lens elements on the optical axis I when the optical imaging lens 10 is in short focus mode;

ΔAAG is the variation of the sum of the air gaps of all of the lens elements of the optical imaging lens 10 in telephoto mode and short focus mode, that is, the difference between $AAG_t$ and $AAG_w$;

ΔEFL is the variation of the effective focal length of the optical imaging lens 10 in telephoto mode and short focus mode, that is, the difference between ft and fw;

f1 is the focal length of the first lens element group 1;

f2 is the focal length of the second lens element group 2;

f3 is the focal length of the third lens element group 3;

f11 is the focal length of the 1A lens element 11;

f12 is the focal length of the 1B lens element 12;

f13 is the focal length of the 1C lens element 13;

f21 is the focal length of the 2A lens element 21;

f22 is the focal length of the 2B lens element 22;

f23 is the focal length of the 2C lens element 23;

f24 is the focal length of the 2D lens element 24;

f31 is the focal length of the 3A lens element 31;

f32 is the focal length of the 3B lens element 32;
f33 is the focal length of the 3C lens element 33;
n11 is the refractive index of the 1A lens element 11;
n12 is the refractive index of the 1B lens element 12;
n13 is the refractive index of the 1C lens element 13;
n21 is the refractive index of the 2A lens element 21;
n22 is the refractive index of the 2B lens element 22;
n23 is the refractive index of the 2C lens element 23;
n24 is the refractive index of the 2D lens element 24;
n31 is the refractive index of the 3A lens element 31;
n32 is the refractive index of the 3B lens element 32;
n33 is the refractive index of the 3C lens element 33;
V11 is the Abbe number of the 1A lens element 11;
V12 is the Abbe number of the 1B lens element 12;
V13 is the Abbe number of the 1C lens element 13;
V21 is the Abbe number of the 2A lens element 21;
V22 is the Abbe number of the 2B lens element 22;
V23 is the Abbe number of the 2C lens element 23;
V24 is the Abbe number of the 2D lens element 24;
V31 is the Abbe number of the 3A lens element 31;
V32 is the Abbe number of the 3B lens element 32; and
V33 is the Abbe number of the 3C lens element 33.

Referring further to FIG. 7A to FIG. 7H, the diagrams of FIG. 7A and FIG. 7E respectively illustrate the longitudinal spherical aberration on the image plane 99 at wavelengths of 470 nm, 555 nm, and 650 nm when the first embodiment is in telephoto mode and short focus mode, respectively. The diagrams of FIG. 7B and FIG. 7F respectively illustrate the field curvature aberration in regards to the sagittal direction on the image plane 99 at wavelengths of 470 nm, 555 nm, and 650 nm when the first embodiment is in telephoto mode and short focus mode, respectively. The diagrams of FIG. 7C and FIG. 7G respectively illustrate the field curvature aberration in regards to the tangential direction on the image plane 99 at wavelengths of 470 nm, 555 nm, and 650 nm when the first embodiment is in telephoto mode and short focus mode, respectively. The diagrams of FIG. 7D and FIG. 7H respectively illustrate the distortion aberration on the image plane 99 at wavelengths of 470 nm, 555 nm, and 650 nm when the first embodiment is in telephoto mode and short focus mode, respectively. The longitudinal spherical aberration of the first embodiment is shown in FIG. 7A and FIG. 7E, wherein the curves formed by various wavelengths are all very close and are near the center, indicating the off-axis rays at different heights of each wavelength are all concentrated near the image point, and it may be seen from the deflection amplitude of the curve of each wavelength that, the image point deviation of the off-axis rays at different heights is controlled within a range of ±0.06 mm, and therefore in the present first embodiment, the spherical aberration of the same wavelength is indeed significantly alleviated. Moreover, the distances between the three representative wavelengths are also relatively close, indicating the imaging positions of different wavelength rays are relatively concentrated, and therefore the chromatic aberration is also significantly alleviated.

In the four field curvature aberration figures of FIG. 7B, FIG. 7C, FIG. 7F, and FIG. 7G, the focal length variations of three representative wavelengths in the entire field of view is within ±0.04 mm, indicating that the optical system of the first embodiment may effectively eliminate aberrations. The distortion aberration diagrams of FIG. 7D and FIG. 7H show that the distortion aberration of the present embodiment is maintained within a range of ±4%, indicating that the distortion aberration of the first embodiment meets the imaging quality requirements of the optical system. Accordingly, it may be shown that the present first embodiment may still provide good imaging quality compared with the existing optical lens. Therefore, under the condition of maintaining good optical performance, the first embodiment may have a smaller f-number, a smaller volume, and still have good optical performance under different focal lengths.

Figure 10:
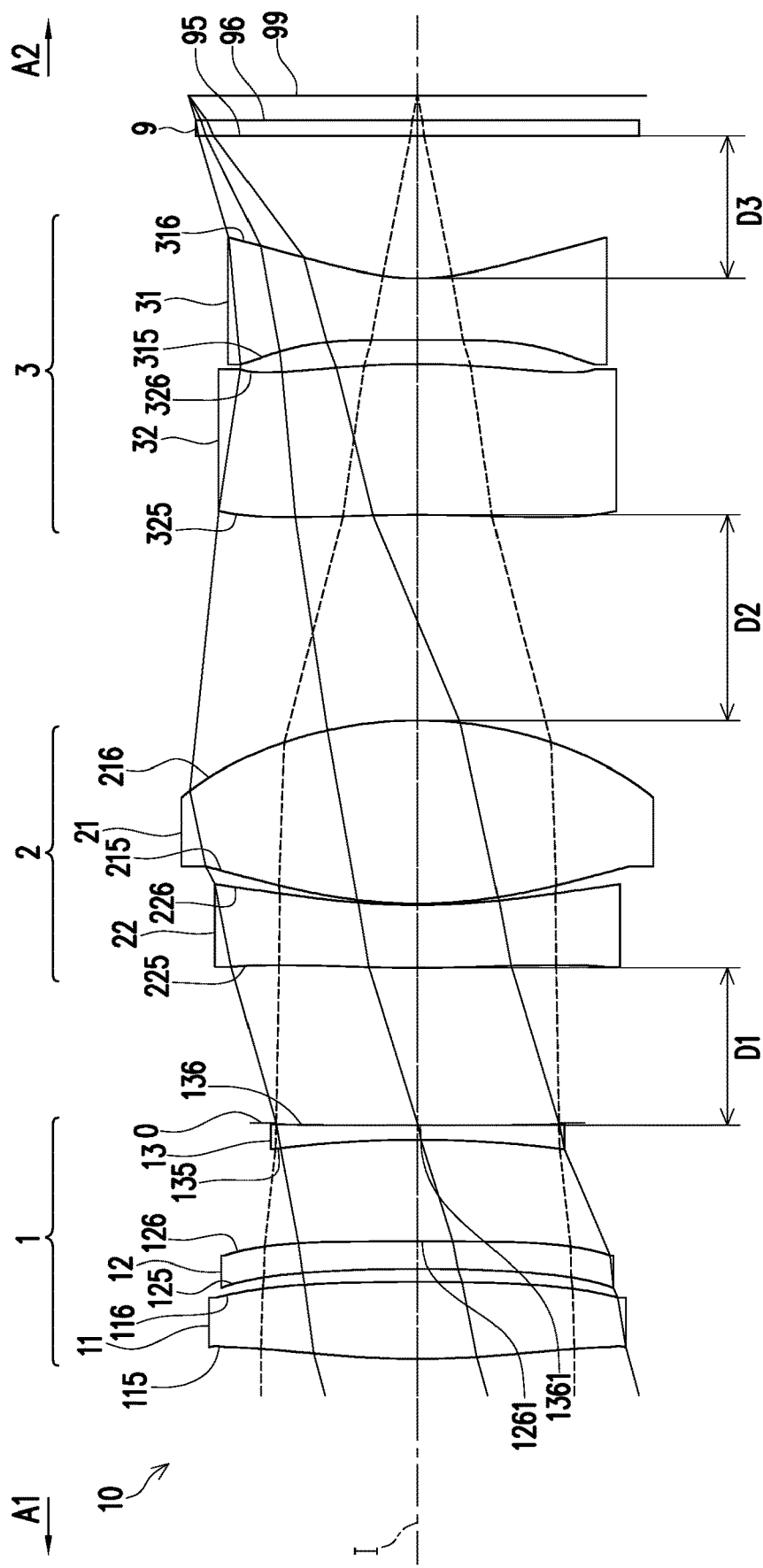
FIG. 10 is a schematic of the optical imaging lens of the second embodiment of the invention.

FIG. 10 is a schematic of the optical imaging lens of the second embodiment of the invention. FIG. 11A to FIG. 11H are diagrams of the longitudinal spherical aberration and various aberrations of the optical imaging lens of the second embodiment. Referring first to FIG. 10, the second embodiment of the optical imaging lens 10 of the invention is substantially similar to the first embodiment, and the difference between the two is as follows: the optical data, the aspheric coefficients, and the parameters of the lens elements 11, 12, 13, 22, 21, 32, and 31 are slightly different. In addition, in the present embodiment, the first lens element group 1 has positive refracting power, and the optical axis region 1261 of the image-side surface 126 of the 1B lens element 12 is convex. The optical axis region 1361 of the image-side surface 136 of the 1C lens element 13 is convex. It should be mentioned here that, to clearly show the figure, in FIG. 10, the reference numerals of the optical axis region and the periphery region similar to the surface shape in the first embodiment are omitted.

The detailed optical data of the optical imaging lens 10 of the second embodiment is shown in FIG. 12. When the adjustable air gaps D1, D2, and D3 of the optical imaging lens 10 of the second embodiment are 2.139 mm, 2.788 mm, and 1.936 mm, respectively, the optical imaging lens 10 is in short focus mode, and has an EFL of 11.020 mm, an Fno of 2.597, and an HFOV of 15.326 degrees. Moreover, the distance from the object-side surface 115 of the 1A lens element 11 to the image-side surface 316 of the 3A lens element 31 on the optical axis I is 14.679 mm, and the distance from the image-side surface 316 of the 3A lens element 31 to the image plane 99 on the optical axis I is 2.480 mm. Moreover, when the adjustable air gaps D1, D2, and D3 of the optical imaging lens 10 of the second embodiment are 0.606 mm, 1.505 mm, and 4.753 mm, respectively, the optical imaging lens 10 is in telephoto mode, and has an EFL of 13.911 mm, an Fno of 3.278, and an HFOV of 12.201 degrees. Moreover, the distance from the object-side surface 115 of the 1A lens element 11 to the image-side surface 316 of the 3A lens element 31 on the optical axis I is 11.862 mm, and the distance from the image-side surface 316 of the 3A lens element 31 to the image plane 99 on the optical axis I is 5.296 mm.

FIG. 13 shows each of the aspheric coefficients of the object-side surface 115 of the 1A lens element 11 to the image-side surface 316 of the 3A lens element 31 of the second embodiment in general formula (1).

Moreover, the relationship between each of the important parameters in the optical imaging lens 10 of the second embodiment is as shown in FIG. 38.

FIG. 11A and FIG. 11E show the longitudinal spherical aberration of the second embodiment in telephoto mode and short focus mode, respectively, and the image point deviation of off-axis rays of different heights is controlled within a range of ±0.035 mm. In the four diagrams of field curvature aberration of FIG. 11B, FIG. 11C, FIG. 11F, and FIG. 11G in telephoto mode and short focus mode, respectively, the focal length variations of the three representative wavelengths fall within ±0.04 mm over the entire field of view. The distortion aberration diagrams in telephoto mode and short focus mode of FIG. 11D and FIG. 11H show that the distortion aberration of the present embodiment is maintained within a range of ±4%.

It may be known from the above description that the HFOV of the second embodiment is larger than the HFOV of the first embodiment. Therefore, compared with the first embodiment, the second embodiment has a larger angular range for receiving images. Furthermore, the longitudinal spherical aberration of the second embodiment is less than the longitudinal spherical aberration of the first embodiment.

Figure 14:
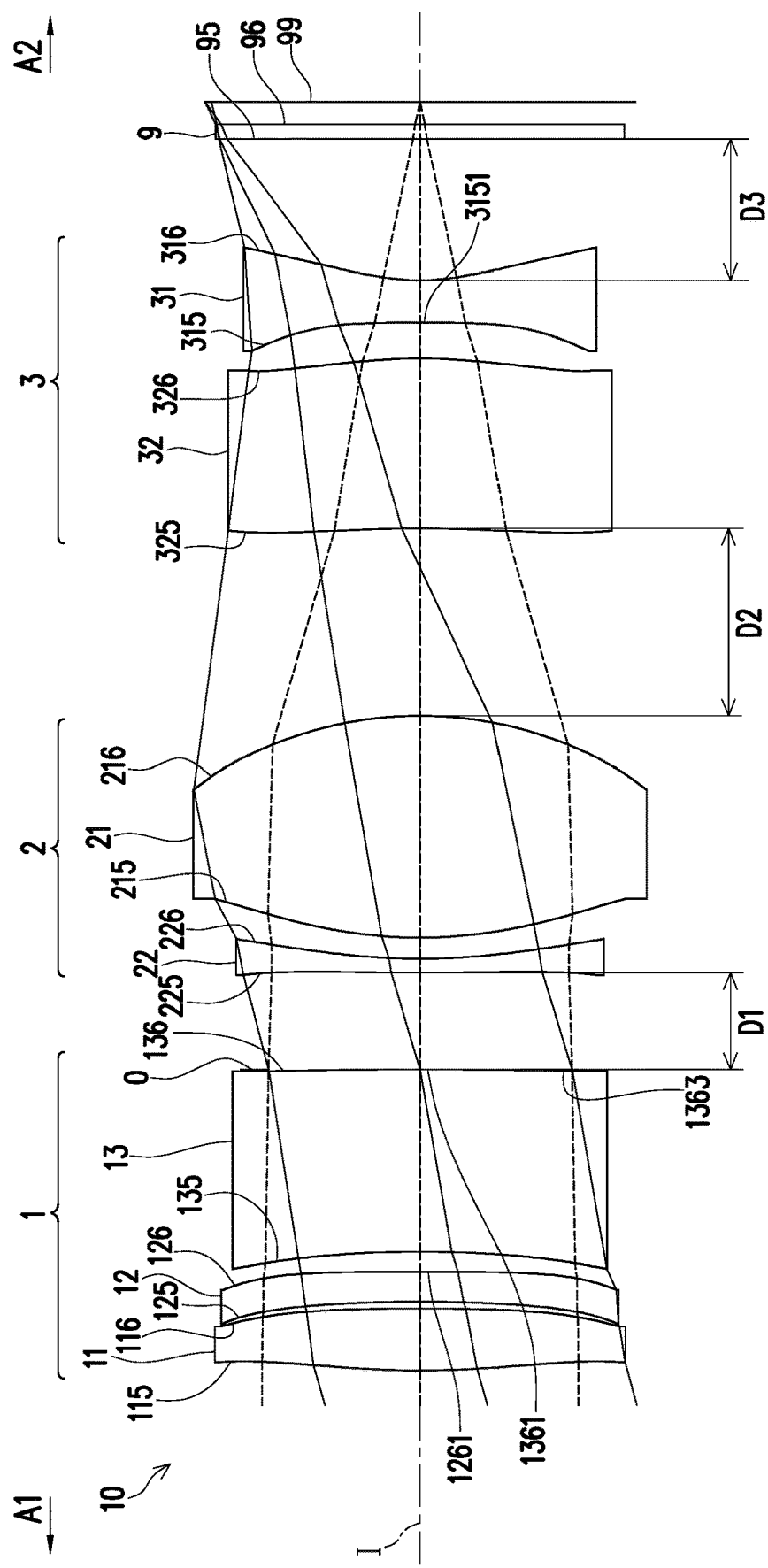
FIG. 14 is a schematic of the optical imaging lens of the third embodiment of the invention.

FIG. 14 is a schematic of the optical imaging lens of the third embodiment of the invention. FIG. 15A to FIG. 15H are diagrams of the longitudinal spherical aberration and various aberrations of the optical imaging lens of the third embodiment. Referring first to FIG. 14, the third embodiment of the optical imaging lens 10 of the invention is substantially similar to the first embodiment, and the difference between the two is as follows: the optical data, the aspheric coefficients, and the parameters of the lens elements 11, 12, 13, 22, 21, 32, and 31 are slightly different. In addition, in the present embodiment, the first lens element group 1 has positive refracting power, and the optical axis region 1261 of the image-side surface 126 of the 1B lens element 12 is convex. The optical axis region 1361 of the image-side surface 136 of the 1C lens element 13 is convex. The periphery region 1363 of the image-side surface 136 of the 1C lens element 13 is convex. The optical axis region 3151 of the object-side surface 315 of the 3A lens element 31 is concave. It should be mentioned here that, to clearly show the figure, in FIG. 14, the reference numerals of the optical axis region and the periphery region similar to the surface shape in the first embodiment are omitted.

The detailed optical data of the optical imaging lens 10 of the third embodiment is shown in FIG. 16. When the adjustable air gaps D1, D2, and D3 of the optical imaging lens 10 of the third embodiment are 1.392 mm, 2.708 mm, and 2.040 mm, respectively, the optical imaging lens 10 is in short focus mode, and has an EFL of 10.871 mm, an Fno of 2.380, and an HFOV of 15.723 degrees. Moreover, the distance from the object-side surface 115 of the 1A lens element 11 to the image-side surface 316 of the 3A lens element 31 on the optical axis I is 15.742 mm, and the distance from the image-side surface 316 of the 3A lens element 31 to the image plane 99 on the optical axis I is 2.570 mm. Moreover, when the adjustable air gaps D1, D2, and D3 of the optical imaging lens 10 of the third embodiment are 0.016 mm, 1.588 mm, and 4.536 mm, respectively, the optical imaging lens 10 is in telephoto mode, and has an EFL of 13.279 mm, an Fno of 2.908, and an HFOV of 12.910 degrees. Moreover, the distance from the object-side surface 115 of the 1A lens element 11 to the image-side surface 316 of the 3A lens element 31 on the optical axis I is 13.246 mm, and the distance from the image-side surface 316 of the 3A lens element 31 to the image plane 99 on the optical axis I is 5.066 mm.

FIG. 17 shows each of the aspheric coefficients of the object-side surface 115 of the 1A lens element 11 to the image-side surface 316 of the 3A lens element 31 of the third embodiment in general formula (1).

Moreover, the relationship between each of the important parameters in the optical imaging lens 10 of the third embodiment is as shown in FIG. 38.

FIG. 15A and FIG. 15E show the longitudinal spherical aberration of the third embodiment in telephoto mode and short focus mode, respectively, and the image point deviation of off-axis rays of different heights is controlled within a range of ±0.04 mm. In the four diagrams of field curvature aberration of FIG. 15B, FIG. 15C, FIG. 15F, and FIG. 15G in telephoto mode and short focus mode, respectively, the focal length variations of the three representative wavelengths fall within ±0.04 mm over the entire field of view. The distortion aberration diagrams in telephoto mode and short focus mode of FIG. 15D and FIG. 15H show that the distortion aberration of the present embodiment is maintained within a range of ±2.5%.

It may be known from the above description that the HFOV of the third embodiment is larger than the HFOV of the first embodiment. Therefore, compared with the first embodiment, the third embodiment has a larger angular range for receiving images. The aperture of the third embodiment is larger than the aperture of the first embodiment. Therefore, compared with the first embodiment, the third embodiment has a larger luminous influx. In addition, the longitudinal spherical aberration of the third embodiment is smaller than the longitudinal spherical aberration of the first embodiment, and the distortion aberration of the third embodiment is smaller than the distortion aberration of the first embodiment.

Figure 18:
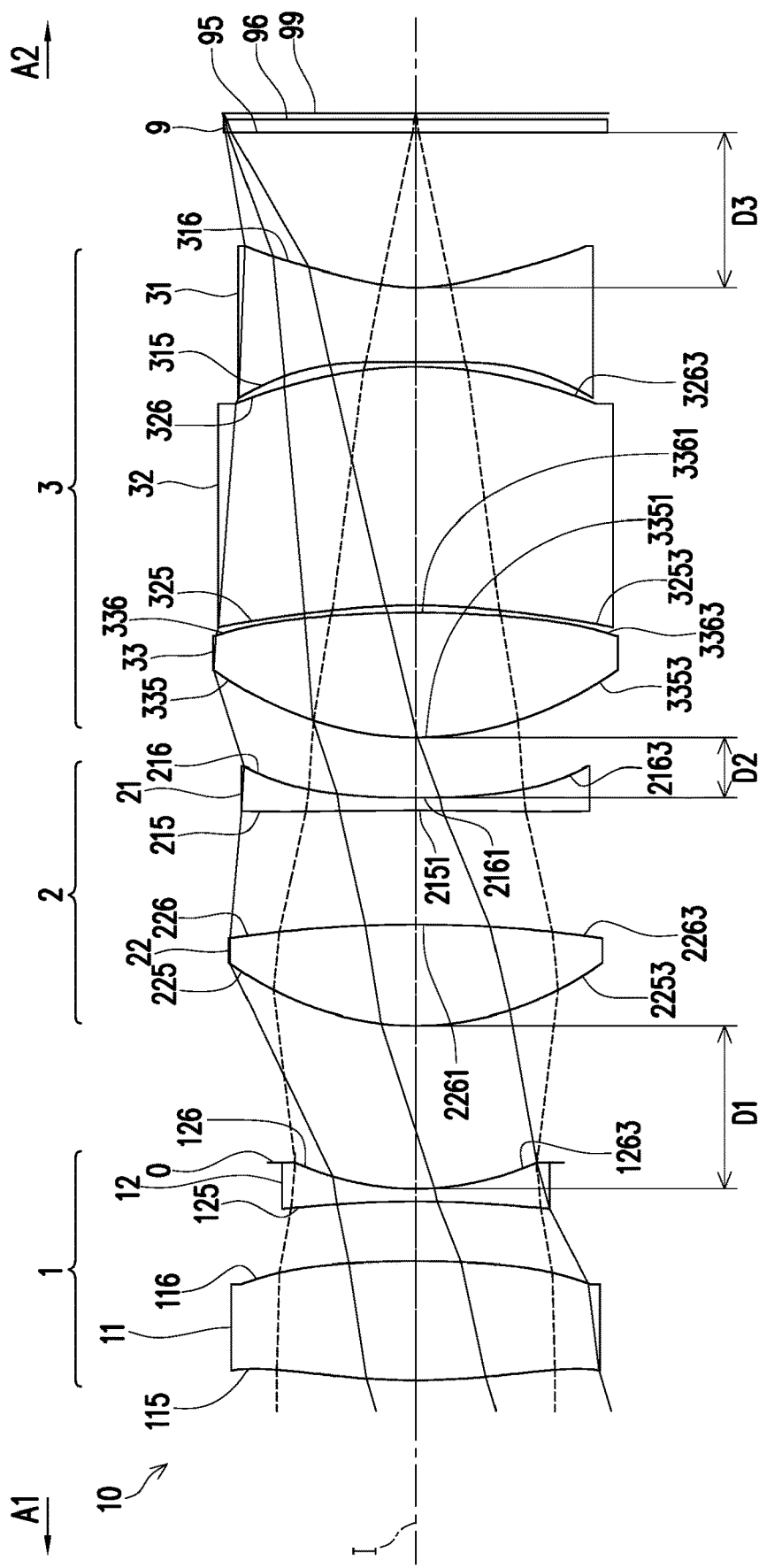
FIG. 18 is a schematic of the optical imaging lens of the fourth embodiment of the invention.

FIG. 18 is a schematic of the optical imaging lens of the fourth embodiment of the invention. FIG. 19A to FIG. 19H are diagrams of the longitudinal spherical aberration and various aberrations of the optical imaging lens of the fourth embodiment. Referring first to FIG. 18, the fourth embodiment of the optical imaging lens 10 of the invention is substantially similar to the first embodiment, and the difference between the two is as follows: in the present embodiment, the first lens element group 1 does not include the 1C lend element 13, and the rest of the optical data, aspheric coefficients, and parameters of the lens elements 1, 11, 12, 22, 21, 32, and 31 are slightly different. Furthermore, in the present embodiment, the third lens element group 3 has positive refracting power. The periphery region 1263 of the image-side surface 126 of the 1B lens element 12 is concave. The 2B lens element 22 has positive refracting power. The periphery region 2253 of the object-side surface 225 of the 2B lens element 22 is convex. The optical axis region 2261 of the image-side surface 226 of the 2B lens element 22 is convex. The periphery region 2263 of the image-side surface 226 of the 2B lens element 22 is convex. The 2A lens element 21 has negative refracting power. The optical axis region 2151 of the object-side surface 215 of the 2A lens element 21 is concave. The optical axis region 2161 of the image-side surface 216 of the 2A lens element 21 is concave. The periphery region 2163 of the image-side surface 216 of the 2A lens element 21 is concave. The periphery region 3253 of the object-side surface 325 of the 3B lens element 32 is concave. The periphery region 3263 of the image-side surface 326 of the 3B lens element 32 is convex. It should be mentioned here that, to clearly show the figure, in FIG. 18, the reference numerals of the optical axis region and the periphery region similar to the surface shape in the first embodiment are omitted.

Moreover, in the present embodiment, the third lens element group 3 further includes a 3C lens element 33, which is a lens element in a third order of the third lens element group 3 counted from the image side A2. Similar to other lens elements, the 3C lens element 33 has an object-side surface 335 facing the object side A1 and allowing an imaging ray to pass through and an image-side surface 336 facing the image side A2 and allowing the imaging ray to pass through. The 3C lens element 33 has positive refracting power. An optical axis region 3351 of the object-side surface 335 of the 3C lens element 33 is convex, and a periphery region 3353 thereof is convex. An optical axis region 3361 of the image-side surface 336 of the 3C lens element 33 is convex, and a periphery region 3363 thereof is convex. In the present embodiment, the object-side surface 335 and the image-side surface 336 of the 3C lens element 33 are both aspheric surfaces, but the invention is not limited thereto.

The detailed optical data of the optical imaging lens 10 of the fourth embodiment is shown in FIG. 20. When the adjustable air gaps D1, D2, and D3 of the optical imaging lens 10 of the fourth embodiment are 2.632 mm, 0.970 mm, and 2.496 mm, respectively, the optical imaging lens 10 is in short focus mode, and has an EFL of 11.000 mm, an Fno of 2.386, and an HFOV of 11.717 degrees. Moreover, the distance from the object-side surface 115 of the 1A lens element 11 to the image-side surface 316 of the 3A lens element 31 on the optical axis I is 17.609 mm, and the distance from the image-side surface 316 of the 3A lens element 31 to the image plane 99 on the optical axis I is 2.805 mm. Moreover, when the adjustable air gaps D1, D2, and D3 of the optical imaging lens 10 of the fourth embodiment are 0.066 mm, 2.428 mm, and 3.605 mm, respectively, the optical imaging lens 10 is in telephoto mode, and has an EFL of 15.181 mm, an Fno of 3.294, and an HFOV of 16.318 degrees. Moreover, the distance from the object-side surface 115 of the 1A lens element 11 to the image-side surface 316 of the 3A lens element 31 on the optical axis I is 16.501 mm, and the distance from the image-side surface 316 of the 3A lens element 31 to the image plane 99 on the optical axis I is 2.805 mm.

FIG. 21 shows each of the aspheric coefficients of the object-side surface 115 of the 1A lens element 11 to the image-side surface 316 of the 3A lens element 31 of the fourth embodiment in general formula (1).

Moreover, the relationship between each of the important parameters in the optical imaging lens 10 of the fourth embodiment is as shown in FIG. 39.

FIG. 19A and FIG. 19E show the longitudinal spherical aberration of the fourth embodiment in telephoto mode and short focus mode, respectively, and the image point deviation of off-axis rays of different heights is controlled within a range of ±0.014 mm. In the four diagrams of field curvature aberration of FIG. 19B, FIG. 19C, FIG. 19F, and FIG. 19G in telephoto mode and short focus mode, respectively, the focal length variations of the three representative wavelengths fall within ±0.02 mm over the entire field of view. The distortion aberration diagrams in telephoto mode and short focus mode of FIG. 19D and FIG. 19H show that the distortion aberration of the present embodiment is maintained within a range of ±4%.

It may be known from the above description that the HFOV of the fourth embodiment is larger than the HFOV of the first embodiment. Therefore, compared with the first embodiment, the fourth embodiment has a larger angular range for receiving images. The aperture of the fourth embodiment is larger than the aperture of the first embodiment. Therefore, compared with the first embodiment, the fourth embodiment has a larger luminous influx. In addition, the longitudinal spherical aberration of the fourth embodiment is smaller than the longitudinal spherical aberration of the first embodiment, and the field curvature aberration of the fourth embodiment is smaller than the field curvature aberration of the first embodiment.

Figure 22:
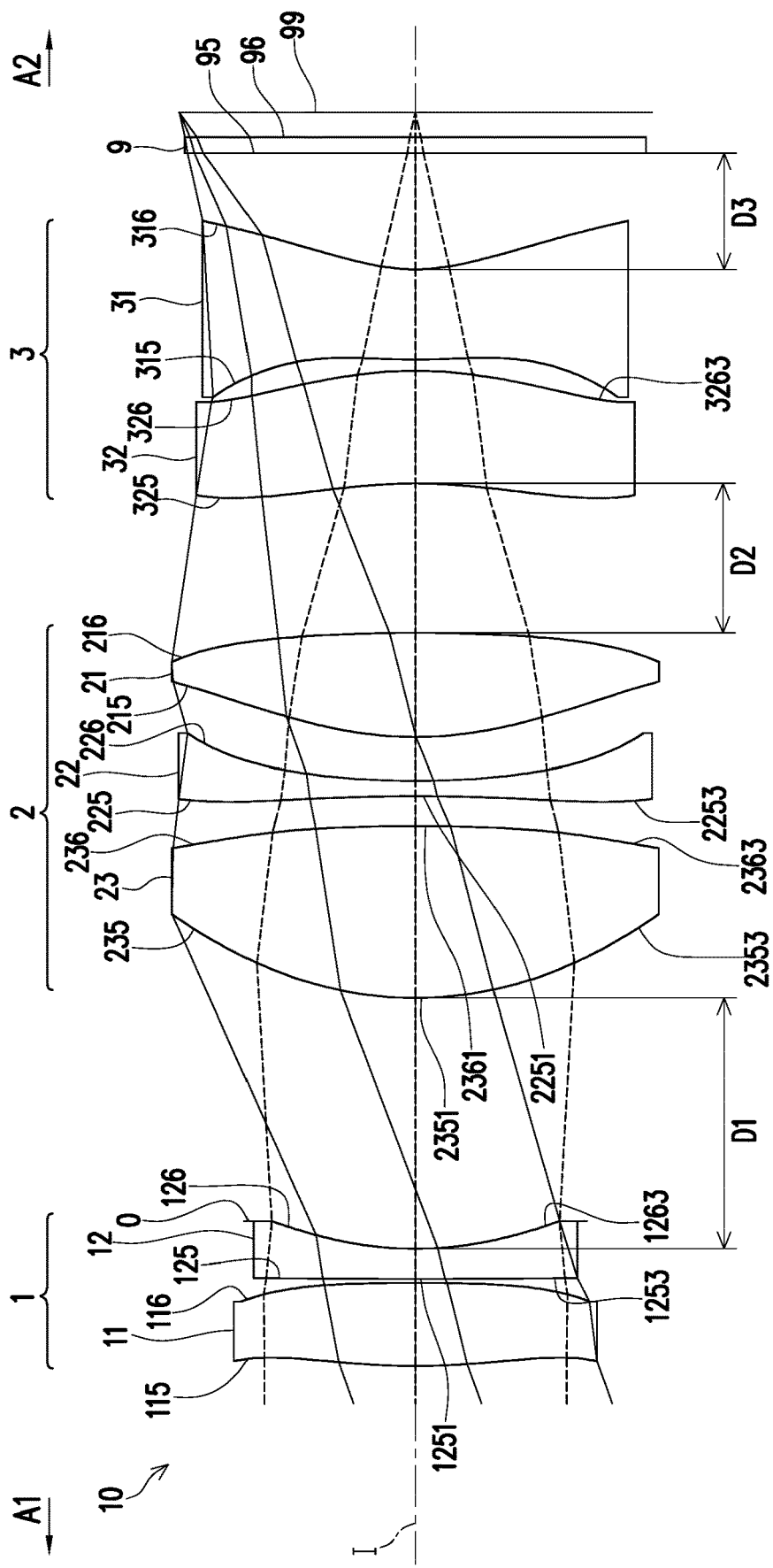
FIG. 22 is a schematic of the optical imaging lens of the fifth embodiment of the invention.

FIG. 22 is a schematic of the optical imaging lens of the fifth embodiment of the invention. FIG. 23A to FIG. 23H are diagrams of the longitudinal spherical aberration and various aberrations of the optical imaging lens of the fifth embodiment. Referring first to FIG. 22, the fifth embodiment of the optical imaging lens 10 of the invention is substantially similar to the first embodiment, and the difference between the two is as follows: in the present embodiment, the first lens element group 1 does not include the 1C lend element 13, and the rest of the optical data, aspheric coefficients, and parameters of the lens elements 11, 12, 22, 21, 32, and 31 are slightly different. Moreover, in the present embodiment, the optical axis region 1251 of the object-side surface 125 of the 1B lens element 12 is convex. The periphery region 1253 of the object-side surface 125 of the 1B lens element 12 is convex. The periphery region 1263 of the image-side surface 126 of the 1B lens element 12 is concave. The optical axis region 2251 of the object-side surface 225 of the 2B lens element 22 is concave. The periphery region 2253 of the object-side surface 225 of the 2B lens element 22 is convex. The periphery region 3263 of the image-side surface 326 of the 3B lens element 32 is convex. It should be mentioned here that, to clearly show the figure, in FIG. 22, the reference numerals of the optical axis region and the periphery region similar to the surface shape in the first embodiment are omitted.

Moreover, in the present embodiment, the second lens element group 2 further includes a 3C lens element 23, which is the third lens element of the second lens element group 2 counted from the image side A2. Similar to other lens elements, the 2C lens element 23 has an object-side surface 235 facing the object side A1 and allowing an imaging ray to pass through and an image-side surface 236 facing the image side A2 and allowing the imaging ray to pass through. The 2C lens element 23 has positive refracting power. An optical axis region 2351 of the object-side surface 235 of the 2C lens element 23 is convex, and a periphery region 2353 thereof is convex. An optical axis region 2361 of the image-side surface 236 of the 2C lens element 23 is convex, and a periphery region 2363 thereof is convex. In the present embodiment, the object-side surface 235 and the image-side surface 236 of the 2C lens element 23 are both aspheric surfaces, but the invention is not limited thereto.

The detailed optical data of the optical imaging lens 10 of the fifth embodiment is shown in FIG. 24. When the adjustable air gaps D1, D2, and D3 of the optical imaging lens 10 of the fifth embodiment are 3.294 mm, 1.961 mm, and 1.530 mm, respectively, the optical imaging lens 10 is in short focus mode, and has an EFL of 8.910 mm, an Fno of 2.195, and an HFOV of 12.958 degrees. Moreover, the distance from the object-side surface 115 of the 1A lens element 11 to the image-side surface 316 of the 3A lens element 31 on the optical axis I is 14.406 mm, and the distance from the image-side surface 316 of the 3A lens element 31 to the image plane 99 on the optical axis I is 2.063 mm. Moreover, when the adjustable air gaps D1, D2, and D3 of the optical imaging lens 10 of the fifth embodiment are 1.007 mm, 0.134 mm, and 5.857 mm, respectively, the optical imaging lens 10 is in telephoto mode, and has an EFL of 13.369 mm, an Fno of 3.294, and an HFOV of 19.876 degrees. Moreover, the distance from the object-side surface 115 of the 1A lens element 11 to the image-side surface 316 of the 3A lens element 31 on the optical axis I is 10.291 mm, and the distance from the image-side surface 316 of the 3A lens element 31 to the image plane 99 on the optical axis I is 6.389 mm.

FIG. 25 shows each of the aspheric coefficients of the object-side surface 115 of the 1A lens element 11 to the image-side surface 316 of the 3A lens element 31 of the fifth embodiment in general formula (1).

Moreover, the relationship between each of the important parameters in the optical imaging lens 10 of the fifth embodiment is as shown in FIG. 39.

FIG. 23A and FIG. 23E show the longitudinal spherical aberration of the fifth embodiment in telephoto mode and short focus mode, respectively, and the image point deviation of off-axis rays of different heights is controlled within a range of ±0.02 mm. In the four diagrams of field curvature aberration of FIG. 23B, FIG. 23C, FIG. 23F, and FIG. 19G in telephoto mode and short focus mode, respectively, the focal length variations of the three representative wavelengths fall within ±0.02 mm over the entire field of view. The distortion aberration diagrams in telephoto mode and short focus mode of FIG. 23D and FIG. 23H show that the distortion aberration of the present embodiment is maintained within a range of ±4%.

It may be known from the above description that the HFOV of the fifth embodiment is larger than the HFOV of the first embodiment. Therefore, compared with the first embodiment, the fifth embodiment has a larger angular range for receiving images. In addition, the longitudinal spherical aberration of the fifth embodiment is smaller than the longitudinal spherical aberration of the first embodiment, and the field curvature aberration of the fifth embodiment is smaller than the field curvature aberration of the first embodiment.

Figure 26:
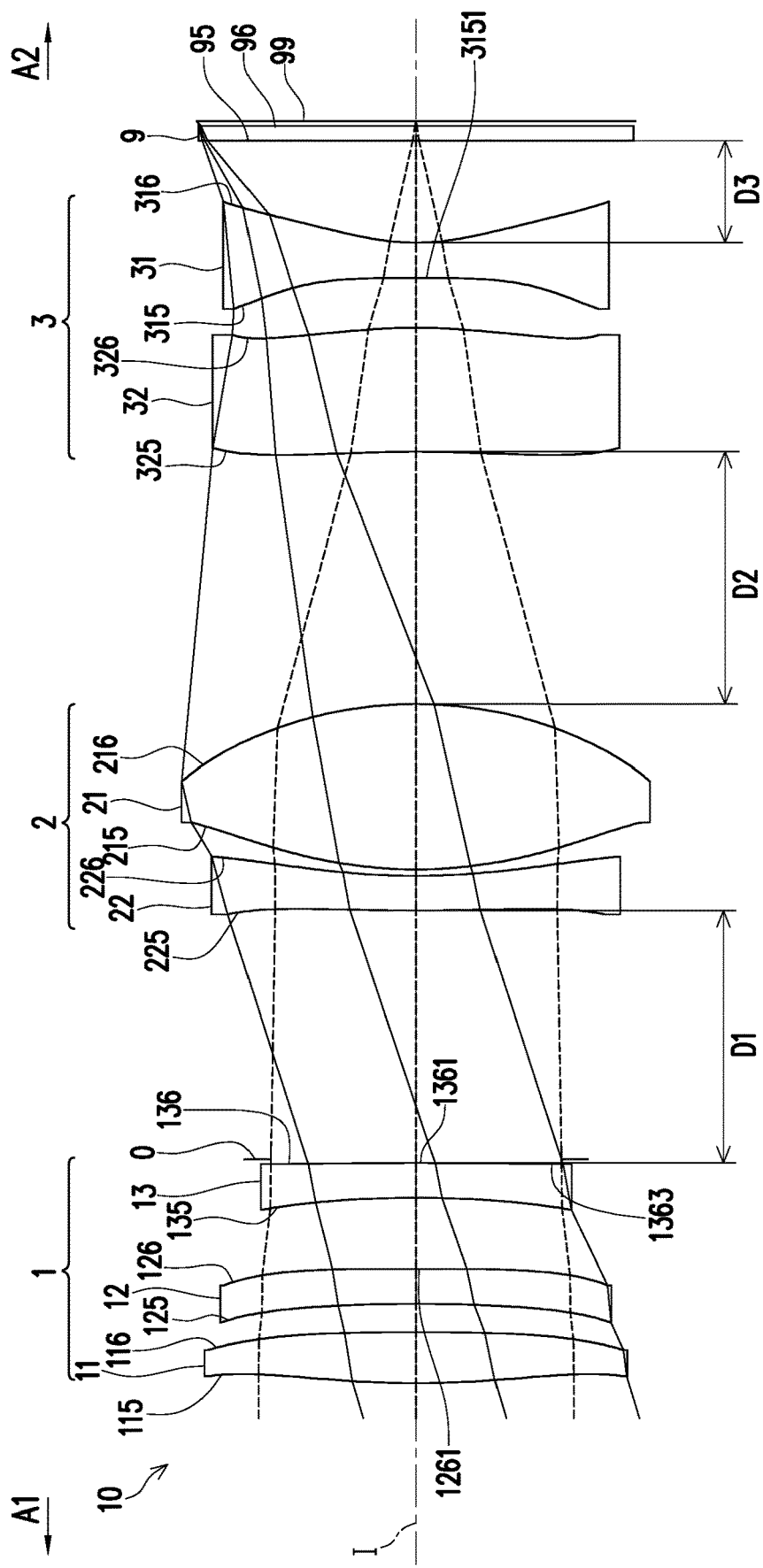
FIG. 26 is a schematic of the optical imaging lens of the sixth embodiment of the invention.

FIG. 26 is a schematic of the optical imaging lens of the sixth embodiment of the invention. FIG. 27A to FIG. 27H are diagrams of the longitudinal spherical aberration and various aberrations of the optical imaging lens of the sixth embodiment. Referring first to FIG. 26, the sixth embodiment of the optical imaging lens 10 of the invention is substantially similar to the first embodiment, and the difference between the two is as follows: the optical data, the aspheric coefficients, and the parameters of the lens elements 11, 12, 13, 22, 21, 32, and 31 are slightly different. Furthermore, in the present embodiment, the first lens element group 1 has positive refracting power. The optical axis region 1261 of the image-side surface 126 of the 1B lens element 12 is convex. The optical axis region 1361 of the image-side surface 136 of the 1C lens element 13 is convex. The periphery region 1363 of the image-side surface 136 of the 1C lens element 13 is convex. The optical axis region 3151 of the object-side surface 315 of the 3A lens element 31 is concave. It should be mentioned here that, to clearly show the figure, in FIG. 26, the reference numerals of the optical axis region and the periphery region similar to the surface shape in the first embodiment are omitted.

The detailed optical data of the optical imaging lens 10 of the sixth embodiment is shown in FIG. 28. When the adjustable air gaps D1, D2, and D3 of the optical imaging lens 10 of the sixth embodiment are 3.581 mm, 3.581 mm, and 1.450 mm, respectively, the optical imaging lens 10 is in short focus mode, and has an EFL of 10.221 mm, an Fno of 2.244, and an HFOV of 16.778 degrees. Moreover, the distance from the object-side surface 115 of the 1A lens element 11 to the image-side surface 316 of the 3A lens element 31 on the optical axis I is 16.174 mm, and the distance from the image-side surface 316 of the 3A lens element 31 to the image plane 99 on the optical axis I is 1.728 mm. Moreover, when the adjustable air gaps D1, D2, and D3 of the optical imaging lens 10 of the sixth embodiment are 1.108 mm, 1.322 mm, and 6.176 mm, respectively, the optical imaging lens 10 is in telephoto mode, and has an EFL of 14.930 mm, an Fno of 3.278, and an HFOV of 11.455 degrees. Moreover, the distance from the object-side surface 115 of the 1A lens element 11 to the image-side surface 316 of the 3A lens element 31 on the optical axis I is 11.442 mm, and the distance from the image-side surface 316 of the 3A lens element 31 to the image plane 99 on the optical axis I is 6.455 mm.

FIG. 29 shows each of the aspheric coefficients of the object-side surface 115 of the 1A lens element 11 to the image-side surface 316 of the 3A lens element 31 of the sixth embodiment in general formula (1).

Moreover, the relationship between each of the important parameters in the optical imaging lens 10 of the sixth embodiment is as shown in FIG. 39.

FIG. 27A and FIG. 27E show the longitudinal spherical aberration of the sixth embodiment in telephoto mode and short focus mode, respectively, and the image point deviation of off-axis rays of different heights is controlled within a range of ±0.06 mm. In the four diagrams of field curvature aberration of FIG. 27B, FIG. 27C, FIG. 27F, and FIG. 27G in telephoto mode and short focus mode, respectively, the focal length variations of the three representative wavelengths fall within ±0.06 mm over the entire field of view. The distortion aberration diagrams in telephoto mode and short focus mode of FIG. 27D and FIG. 27H show that the distortion aberration of the present embodiment is maintained within a range of ±3%.

It may be known from the above description that the HFOV of the sixth embodiment is larger than the HFOV of the first embodiment. Therefore, compared with the first embodiment, the sixth embodiment has a larger angular range for receiving images. Furthermore, the distortion aberration of the sixth embodiment is smaller than the distortion aberration of the first embodiment.

Figure 30:
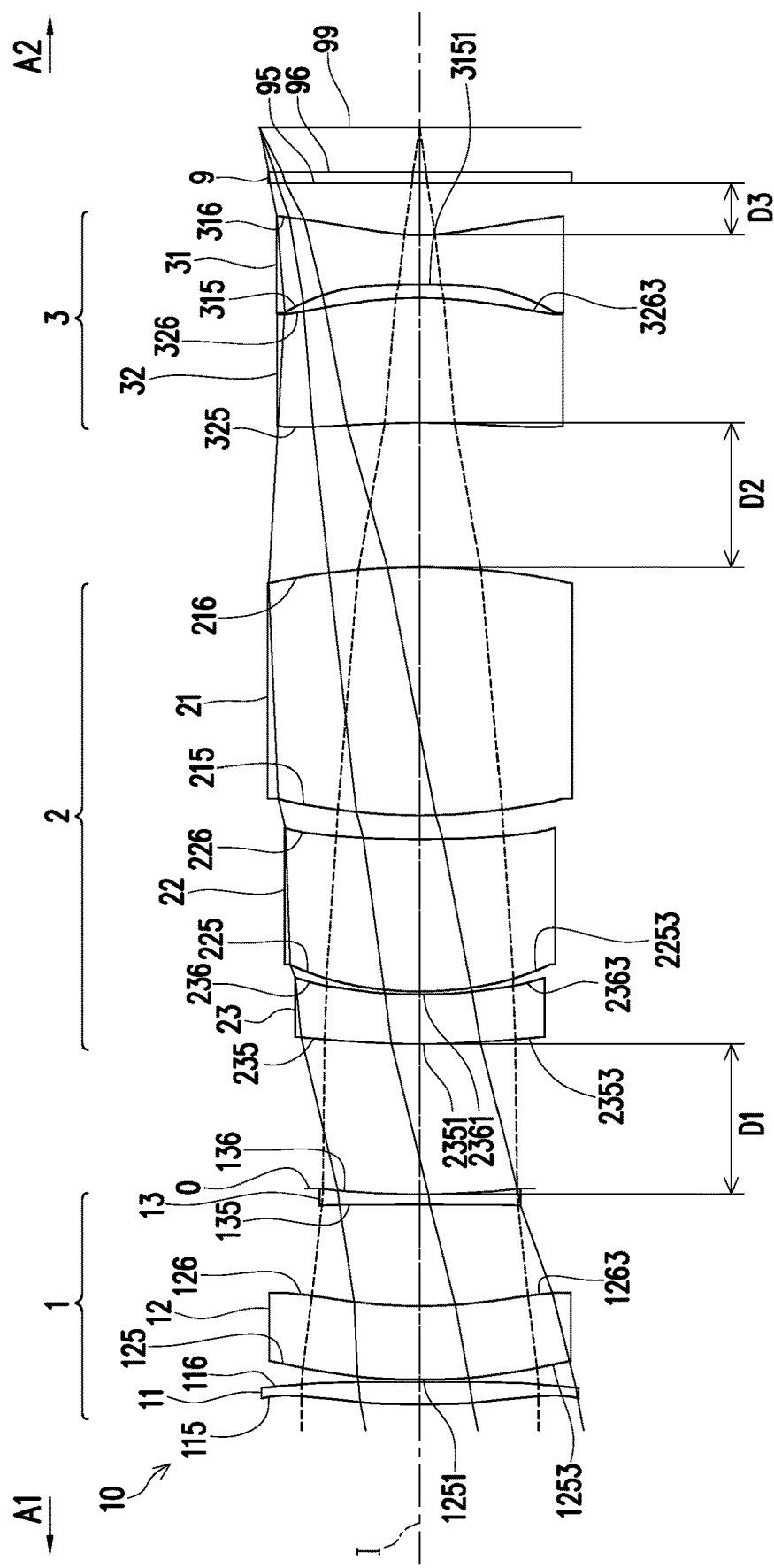
FIG. 30 is a schematic of the optical imaging lens of the seventh embodiment of the invention.

FIG. 30 is a schematic of the optical imaging lens of the seventh embodiment of the invention. FIG. 31A to FIG. 31H are diagrams of the longitudinal spherical aberration and various aberrations of the optical imaging lens of the seventh embodiment. Referring first to FIG. 30, the seventh embodiment of the optical imaging lens 10 of the invention is substantially similar to the first embodiment, and the difference between the two is as follows: the optical data, the aspheric coefficients, and the parameters of the lens elements 11, 12, 13, 22, 21, 32, and 31 are slightly different. Furthermore, in the present embodiment, the first lens element group 1 has positive refracting power. The optical axis region 1251 of the object-side surface 125 of the 1B lens element 12 is convex. The periphery region 1253 of the object-side surface 125 of the 1B lens element 12 is convex. The periphery region 1263 of the image-side surface 126 of the 1B lens element 12 is concave. The 2B lens element 22 has positive refracting power. The periphery region 2253 of the object-side surface 225 of the 2B lens element 22 is convex. The periphery region 3263 of the image-side surface 326 of the 3B lens element 32 is convex. The optical axis region 3151 of the object-side surface 315 of the 3A lens element 31 is concave. It should be mentioned here that, to clearly show the figure, in FIG. 30, the reference numerals of the optical axis region and the periphery region similar to the surface shape in the first embodiment are omitted.

Moreover, in the present embodiment, the second lens element group 2 further includes a 2C lens element 23, which is a lens element in a third order of the second lens element group 2 counted from the image side A2. Similar to other lens elements, the 2C lens element 23 has an object-side surface 235 facing the object side A1 and allowing an imaging ray to pass through and an image-side surface 236 facing the image side A2 and allowing the imaging ray to pass through. The 2C lens element 23 has negative refracting power. The optical axis region 2351 of the object-side surface 235 of the 2C lens element 23 is convex, and the periphery region 2353 thereof is convex. The optical axis region 2361 of the image-side surface 236 of the 2C lens element 23 is concave, and the periphery region 2363 thereof is concave. In the present embodiment, the object-side surface 235 and the image-side surface 236 of the 2C lens element 23 are both aspheric surfaces, but the invention is not limited thereto.

The detailed optical data of the optical imaging lens 10 of the seventh embodiment is shown in FIG. 32. When the adjustable air gaps D1, D2, and D3 of the optical imaging lens 10 of the seventh embodiment are 2.908 mm, 2.782 mm, and 1.002 mm, respectively, the optical imaging lens 10 is in short focus mode, and has an EFL of 15.671 mm, an Fno of 3.431, and an HFOV of 11.220 degrees. Moreover, the distance from the object-side surface 115 of the 1A lens element 11 to the image-side surface 316 of the 3A lens element 31 on the optical axis I is 22.543 mm, and the distance from the image-side surface 316 of the 3A lens element 31 to the image plane 99 on the optical axis I is 2.081 mm. Moreover, when the adjustable air gaps D1, D2, and D3 of the optical imaging lens 10 of the seventh embodiment are 0.033 mm, 0.184 mm, and 6.476 mm, respectively, the optical imaging lens 10 is in telephoto mode, and has an EFL of 21.939 mm, an Fno of 4.804, and an HFOV of 7.989 degrees. Moreover, the distance from the object-side surface 115 of the 1A lens element 11 to the image-side surface 316 of the 3A lens element 31 on the optical axis I is 17.070 mm, and the distance from the image-side surface 316 of the 3A lens element 31 to the image plane 99 on the optical axis I is 7.554 mm.

FIG. 33 shows each of the aspheric coefficients of the object-side surface 115 of the 1A lens element 11 to the image-side surface 316 of the 3A lens element 31 of the seventh embodiment in general formula (1).

Moreover, the relationship between each of the important parameters in the optical imaging lens 10 of the seventh embodiment is as shown in FIG. 40.

FIG. 31A and FIG. 31E show the longitudinal spherical aberration of the seventh embodiment in telephoto mode and short focus mode, respectively, and the image point deviation of off-axis rays of different heights is controlled within a range of ±0.035 mm. In the four diagrams of field curvature aberration of FIG. 31B, FIG. 31C, FIG. 31F, and FIG. 31G in telephoto mode and short focus mode, respectively, the focal length variations of the three representative wavelengths fall within ±0.035 mm over the entire field of view. The distortion aberration diagrams in telephoto mode and short focus mode of FIG. 31D and FIG. 31H show that the distortion aberration of the present embodiment is maintained within a range of ±1%.

It may be known from the above description that: the longitudinal spherical aberration of the seventh embodiment is smaller than the longitudinal spherical aberration of the first embodiment, the field curvature aberration of the seventh embodiment is smaller than the field curvature aberration of the first embodiment, and the distortion aberration of the seventh embodiment is smaller than the distortion aberration of the first embodiment.

Figure 34:
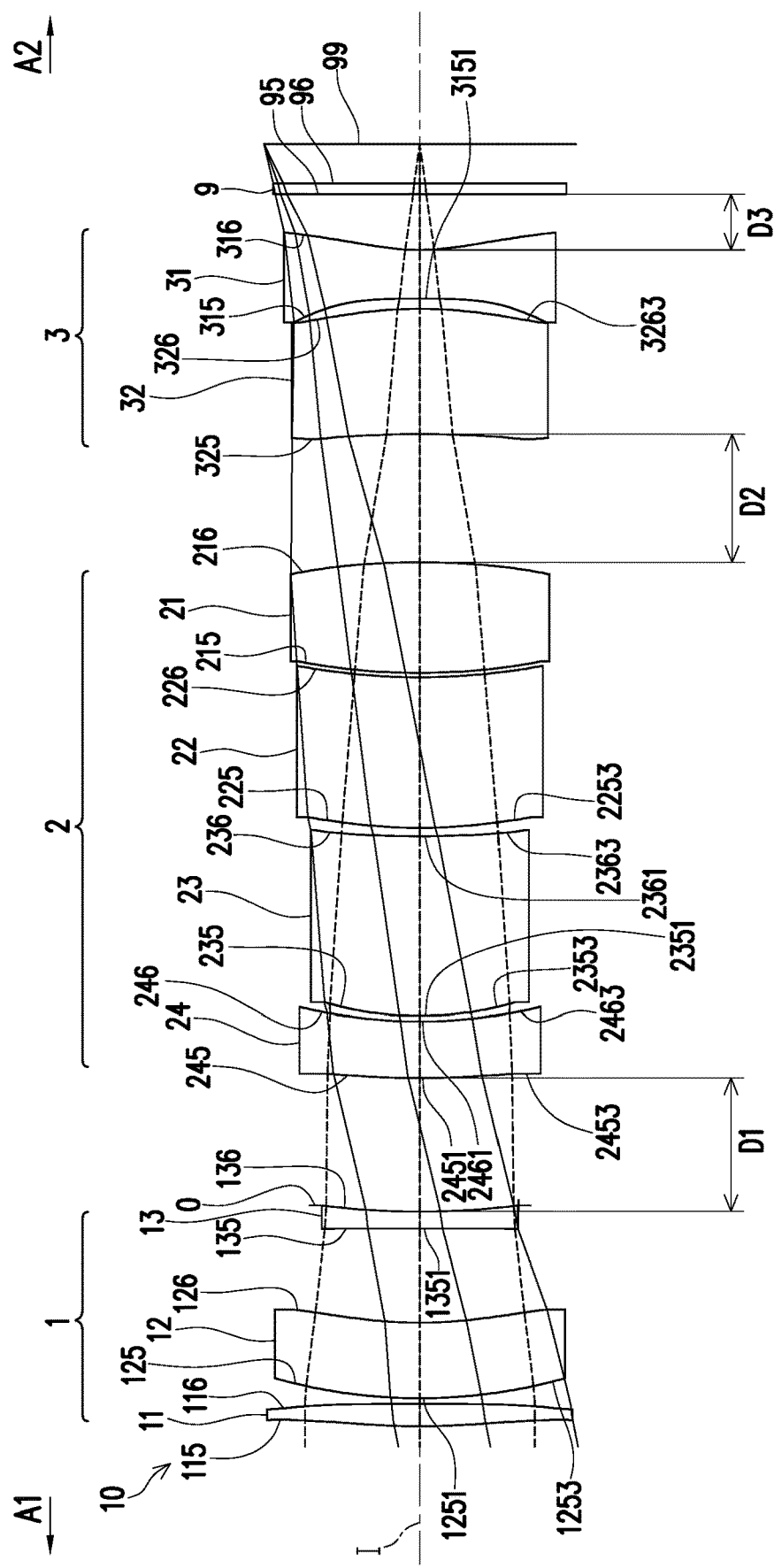
FIG. 34 is a schematic of the optical imaging lens of the eighth embodiment of the invention.

FIG. 34 is a schematic of the optical imaging lens of the eighth embodiment of the invention. FIG. 35A to FIG. 35H are diagrams of the longitudinal spherical aberration and various aberrations of the optical imaging lens of the eighth embodiment. Referring first to FIG. 34, the eighth embodiment of the optical imaging lens 10 of the invention is substantially similar to the first embodiment, and the difference between the two is as follows: the optical data, the aspheric coefficients, and the parameters of the lens elements 11, 12, 13, 22, 21, 32, and 31 are slightly different. Furthermore, in the present embodiment, the first lens element group 1 has positive refracting power. The optical axis region 1251 of the object-side surface 125 of the 1B lens element 12 is convex. The periphery region 1253 of the object-side surface 125 of the 1B lens element 12 is convex. The optical axis region 1351 of the object-side surface 135 of the 1C lens element 13 is convex. The 2B lens element 22 has positive refracting power. The periphery region 2253 of the object-side surface 225 of the 2B lens element 22 is convex. The periphery region 3263 of the image-side surface 326 of the 3B lens element 32 is convex. The optical axis region 3151 of the object-side surface 315 of the 3A lens element 31 is concave. It should be mentioned here that, to clearly show the figure, in FIG. 34, the reference numerals of the optical axis region and the periphery region similar to the surface shape in the first embodiment are omitted.

Moreover, in the present embodiment, the second lens element group 2 further includes a 2C lens element 23 and a 2D lens element 24, the 2C lens element 23 is a lens element in a third order of the second lens element group 3 counted from the image side A2, and the 2D lens element 24 is a lens element in a fourth order of the second lens element group 3 counted from the image side A2. Similar to other lens elements, the 2C lens element 23 and the 2D lens element 24 have object-side surfaces 235 and 245 facing the object side A1 and allowing an imaging ray to pass through and image-side surfaces 236 and 246 facing the image side A2 and allowing the imaging ray to pass through.

The 2C lens element 23 has positive refracting power. The optical axis region 2351 of an object-side surface 235 of the 2C lens element 23 is convex, and the periphery region 2353 thereof is convex. The optical axis region 2361 of the image-side surface 236 of the 2C lens element 23 is concave, and the periphery region 2363 thereof is concave. In the present embodiment, the object-side surface 235 and the image-side surface 236 of the 2C lens element 23 are both aspheric surfaces, but the invention is not limited thereto.

The 2D lens element 24 has negative refracting power. An optical axis region 2451 of the object-side surface 245 of the 2D lens element 24 is convex, and a periphery region 2453 thereof is convex. An optical axis region 2461 of the image-side surface 246 of the 2D lens element 24 is concave, and a periphery region 2463 thereof is concave. In the present embodiment, the object-side surface 245 and the image-side surface 246 of the 2D lens element 24 are both aspheric surfaces, but the invention is not limited thereto.

The detailed optical data of the optical imaging lens 10 of the eighth embodiment is shown in FIG. 36. When the adjustable air gaps D1, D2, and D3 of the optical imaging lens 10 of the eighth embodiment are 2.704 mm, 2.616 mm, and 1.113 mm, respectively, the optical imaging lens 10 is in short focus mode, and has an EFL of 16.189 mm, an Fno of 3.545, and an HFOV of 10.890 degrees. Moreover, the distance from the object-side surface 115 of the 1A lens element 11 to the image-side surface 316 of the 3A lens element 31 on the optical axis I is 23.292 mm, and the distance from the image-side surface 316 of the 3A lens element 31 to the image plane 99 on the optical axis I is 2.106 mm. Moreover, when the adjustable air gaps D1, D2, and D3 of the optical imaging lens 10 of the eighth embodiment are 1.602 mm, 1.180 mm, and 3.650 mm, respectively, the optical imaging lens 10 is in telephoto mode, and has an EFL of 19.196 mm, an Fno of 4.203, and an HFOV of 7.910 degrees. Moreover, the distance from the object-side surface 115 of the 1A lens element 11 to the image-side surface 316 of the 3A lens element 31 on the optical axis I is 20.754 mm, and the distance from the image-side surface 316 of the 3A lens element 31 to the image plane 99 on the optical axis I is 4.644 mm.

FIG. 37 shows each of the aspheric coefficients of the object-side surface 115 of the 1A lens element 11 to the image-side surface 316 of the 3A lens element 31 of the eighth embodiment in general formula (1).

Moreover, the relationship between each of the important parameters in the optical imaging lens 10 of the eighth embodiment is as shown in FIG. 40.

FIG. 35A and FIG. 35E show the longitudinal spherical aberration of the eighth embodiment in telephoto mode and short focus mode, respectively, and the image point deviation of off-axis rays of different heights is controlled within a range of ±0.035 mm. In the four diagrams of field curvature aberration of FIG. 35B, FIG. 35C, FIG. 35F, and FIG. 35G in telephoto mode and short focus mode, respectively, the focal length variations of the three representative wavelengths fall within ±0.018 mm over the entire field of view. The distortion aberration diagrams in telephoto mode and short focus mode of FIG. 35D and FIG. 35H show that the distortion aberration of the present embodiment is maintained within a range of ±0.6%.

It may be known from the above description that: the longitudinal spherical aberration of the eighth embodiment is smaller than the longitudinal spherical aberration of the first embodiment, the field curvature aberration of the eighth embodiment is smaller than the field curvature aberration of the first embodiment, and the distortion aberration of the eighth embodiment is smaller than the distortion aberration of the first embodiment.

Referring further to FIG. 38, FIG. 39, and FIG. 40, FIG. 38 is a table diagram of various optical parameters of the first embodiment to the third embodiment, FIG. 39 is a table diagram of various optical parameters of the fourth embodiment to the sixth embodiment, and FIG. 40 is a table diagram of various optical parameters of the seventh embodiment to the eighth embodiment. It may be known from the optical imaging lens 10 of each of the above embodiments that the optical imaging lens 10 of an embodiment of the invention may obtain the following functions and advantages:

1. When the optical imaging lens 10 is zoomed, at least one lens element group is moved along the optical axis I toward the direction of the object side A1 or the direction of the image side A2, and when the 1A lens element 11 has positive refracting power and the optical axis region 1151 of the object-side surface 115 of the 1A lens element 11 is convex, incident rays of different angles may be effectively collected, and the edge aberration of the image plane 99 may be alleviated. And in conjunction with the optical axis region 3251 of the object-side surface 325 of the 3B lens element 32 of the third lens element group 3 being concave, the periphery region 3253 of the object-side surface 325 of the 3B lens element 32 being convex, and the optical axis region 3161 of the image-side surface 316 of the 3A lens element 31 being concave, the aberration generated during the zooming process of the optical imaging lens 10 may be compensated, so that the optical imaging lens 10 has good optical quality under different focal lengths.

2. When the optical imaging lens 10 is zoomed, at least one lens element group is moved along the optical axis I toward the direction of the object side A1 or the direction of the image side A2, and when the optical axis region 1151 of the object-side surface 115 of the 1A lens element 11 is convex and the periphery region 1153 of the object-side surface 115 of the 1A lens element 11 is concave, incident rays of different angles may be effectively collected, and the edge aberration of the image plane 99 may be alleviated. In conjunction with the 3B lens element 32 of the third lens element group 3 having positive refracting power, the optical axis region 3251 of the object-side surface 325 of the 3B lens element 32 of the third lens element group 3 being concave, and the optical axis region 3161 of the image-side surface 316 of the 3A lens element 31 being concave, the aberration generated by the optical imaging lens 10 during the zooming process may be compensated, so that the optical imaging lens 10 has good optical quality under different focal lengths. When the system length of the optical imaging lens divided by the maximum value of the thicknesses of all of the lens elements in the first lens element group 1 to the third lens element group 3 is less than or equal to 14.000, that is, when TTL/Tmax≤14.000, the volume of the optical imaging lens 10 may be effectively controlled, so that the optical imaging lens 10 is convenient to be used in portable electronic products, and the preferred implementation range of TTL/Tmax is 4.600≤TTL/Tmax≤14.000.

3. When the optical imaging lens 10 is zoomed, at least one lens element group is moved along the optical axis toward the direction of the object side or the direction of the image side, and when the optical axis region 1161 of the image-side surface 116 of the 1A lens element 11 is convex and the periphery region 1163 of the image-side surface 116 of the 1A lens element 11 is convex, incident rays of different angles may be effectively collected, and the edge aberration of the image plane 99 may be alleviated. In conjunction with the optical axis region 3251 of the object-side surface 325 of the 3B lens element 32 of the third lens element group 3 being concave, the optical axis region 3261 of the image-side surface 326 of the 3B lens element 32 being convex, and the optical axis region 3161 of the image-side surface 316 of the 3A lens element 31 being concave, the aberration generated by the optical imaging lens 10 during the zooming process may be compensated, so that the optical imaging lens 10 has good optical quality under different focal lengths. When the system length of the optical imaging lens divided by the maximum value of the thicknesses of all of the lens elements in the first lens element group 1 to the third lens element group 3 is less than or equal to 14.000, that is, when TTL/Tmax≤14.000, the volume of the optical imaging lens 10 may be effectively controlled, so that the optical imaging lens 10 is convenient to be used in portable electronic products, and the preferred implementation range of TTL/Tmax is 4.600≤TTL/Tmax≤14.000.

4. When the inventions of the above 1, 2, and 3 further satisfy that the second lens element group 2 has positive refracting power, the spherical aberration generated by the first lens element group 1 during the zooming process may be better corrected.

5. In the optical imaging lens 10 of the invention, there is an air gap on the optical axis I between two adjacent optical elements (for example, between the aperture 0 and a lens element or between a lens element and a lens element or between a lens element and the filter 9), respectively, wherein this air gap is at least one of the number of adjustable air gaps, at most three, and by controlling the number of adjustable air gaps, the overall assembly volume of the lens may be kept from being too large, so that lightweight and compact requirements may be readily met, and the assembly yield may also be maintained.

6. The optical imaging lens 10 of the invention has three lens element groups, and the three lens element groups interact to achieve the effect of lens zoom, and the volume may be effectively controlled, wherein the first lens element group 1 includes at least one lens element and a maximum of three lens elements, and the first lens element group 1 is fixed relative to the image plane 99, and may mainly effectively collect incident rays of different angles; the second lens element group 2 includes at least two lens elements, at most four, and the second lens element group 2 may move along the optical axis I toward the object side A1 or the image side A2, so that the optical imaging lens 10 may achieve the effect of changing the focal length; the third lens element group 3 includes at least two lens elements and a maximum of three lens elements, the third lens element group 3 may also move toward the object side A1 or the image side A2 along the optical axis I to compensate for the aberrations generated by the second lens element group 2 during the zooming process, and when the second lens element group 2 and the third lens element group 3 change from short focal length to long focal length, they both move toward the object side A1 along the optical axis I. The number of lens elements of the optical imaging lens 10 of the invention is at least seven to ensure that the optical imaging lens 10 may maintain good imaging quality during the zooming process, and the number of lens elements of the optical imaging lens 10 of the invention is no more than nine at most, so that the overall assembly volume of the lens is not too large, so as to meet the light weight requirement.

7. When the zoom magnification, back focal length, effective focal length, and variation thereof of the invention satisfy the following ranges or proportional relationships, the distortion and field curvature aberration of the optical imaging system may be better alleviated.

In particular, the optical imaging lens 10 may satisfy EFL≤23.000 mm, and the preferred range is 8.800 mm≤EFL≤23.000 mm;

the optical imaging lens 10 may satisfy ΔEFL≥2.400 mm, and the preferred range is 2.400 mm≤ΔEFL≤6.800 mm;

the optical imaging lens 10 may satisfy ΔEFL/ ΔBFL≤3.800, and the preferred range is 0.950≤ΔEFL/ ΔBFL≤3.800;

the optical imaging lens 10 may satisfy (Gmax+BFL)/ (T32+G312)≤4.600, and the preferred range is 1.250≤ (Gmax+BFL)/(T32+G312)≤4.600;

the optical imaging lens 10 may satisfy (EFL+ImgH)/ Fno≥5.000 mm, and the preferred range is 5.000 mm≤ (EFL+ImgH)/Fno≤6.500 mm;

the optical imaging lens 10 may satisfy (Gmax+BFL)/ Tavg≤8.100, and the preferred range is 2.500≤(Gmax+ BFL)/Tavg≤8.100;

the optical imaging lens 10 may satisfy (EFL+BFL)/ Fno≥4.950 mm, and the preferred range is 4.950 mm≤ (EFL+BFL)/Fno≤7.100 mm;

the optical imaging lens 10 may satisfy ft/fw≥1.500, and the preferred range is 1.100≤ft/fw≤1.500.

8. When the material of the lens element satisfies the following restrictions, chromatic aberration and spherical aberration generated during zooming process may be effectively suppressed, so that the optical imaging lens 10 may always have good resolution under different focal lengths.

In particular, the optical imaging lens 10 may satisfy V11+V12+ V32≤100.000, and the preferred range is 60.000≤V11+ V12+V32≤100.000;

the optical imaging lens 10 may satisfy V12+V31+ V32≤135.000, and the preferred range is 90.000≤V12+ V31+V32≤135.000; and the optical imaging lens 10 may satisfy V11+ V31≤100.000, and the preferred range is 70.000≤V11+ V31≤100.000;

the optical imaging lens 10 may satisfy V21+ V22≤115.000, and the preferred range is 65.000≤V21+ V22≤115.000;

the optical imaging lens 10 may satisfy V11+V21+ V31≤150.000, and the preferred range is 90.000≤V11+ V21+V31≤150.000;

the optical imaging lens 10 may satisfy V12+V22+ V32≤120.000, and the preferred range is 55.000≤V12+ V22+V32≤120.000.

9. To ensure imaging quality, at the same time, considering the difficulty of production, the air gaps between the lens elements or the thicknesses of the lens elements are suitably shortened or maintained at a certain ratio. When the numerical limits of the following conditional expressions are satisfied, the embodiments of the invention may have a better configuration.

In particular, the optical imaging lens 10 may satisfy TTL/Fno≥5.000 mm, and the preferred range is 5.000 mm≤TTL/ Fno≤9.400 mm;

the optical imaging lens 10 may satisfy (T11+G112+T12)/ Tavg≤2.000, and the preferred range is 0.850≤(T11+ G112+T12)/Tavg≤2.000;

the optical imaging lens 10 may satisfy ALT/(Tmax+ Tmin)≤4.000, and the preferred range is 2.150≤ALT/ (Tmax+Tmin)≤4.000;

the optical imaging lens 10 may conform to TTL/ Gmax≥5.000, and the preferred range is 5.000≤TTL/ Gmax≤34.000, and the more preferred range is 5.000≤TTL/Gmax≤10.300;

the optical imaging lens 10 may satisfy (T11+G112)/ T31≤2.500, and the preferred range is 0.450≤(T11+ G112)/T31≤2.500;

the optical imaging lens 10 may satisfy TL/(Tmax+Tmin) ≤6.000, and the preferred range is 3.100≤TL/(Tmax+ Tmin)≤6.000;

the optical imaging lens 10 may conform to ALT/ Gmax≥1.900, and the preferred range is 1.900≤ALT/ Gmax≤18.000, and the more preferred range is 1.900≤ALT/Gmax≤9.100;

the optical imaging lens 10 may satisfy (T11+T12)/ T32≤1.000, and the preferred range is 0.500≤(T11+ T12)/T32≤1.000;

the optical imaging lens 10 may satisfy (T32+G312+ T31)/Tmin≥6.000, and the preferred range is 6.000≤ (T31+G312+T32)/Tmin≤28.000;

the optical imaging lens 10 may satisfy TL/Tavg 18.000, and the preferred range is 8.000≤TL/Tavg≤18.000;

the optical imaging lens 10 may satisfy T21/T22≤16.100, and the preferred range is 0.100≤T21/T22≤16.100; and the optical imaging lens 10 may satisfy (T21+G212+ T22)/T1≤118.800, and the preferred range is 1.700≤ (T21+G212+T22)/T11≤18.800;

the optical imaging lens 10 may satisfy T11/T12≤9.600, and the preferred range is 0.250≤T11/T12≤9.600;

the optical imaging lens 10 may satisfy T32/T31≤4.100, and the preferred range is 1.100≤T32/T31≤4.100.

In addition, any combination relationship of the parameters of the embodiment may also be selected to increase the lens limit, so as to facilitate the lens design of the same architecture of the invention.

Based on the unpredictability of the optical system design, under the designs of the invention, by satisfying the above conditional expressions, in the invention, lens system length may be reduced, usable aperture is increased, and imaging quality is increased, or assembly yield is increased such that the drawbacks of the prior art are reduced. The use of plastic material for the lens elements of the embodiments of the invention may further reduce the weight of the lens and save costs.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An optical imaging lens, comprising a first lens element group, a second lens element group, and a third lens element group in sequence along an optical axis from an object side to an image side, and lens elements in the first lens element group to the third lens element group each comprise an object-side surface facing the object side and allowing an imaging ray to pass through and an image-side surface facing the image side and allowing the imaging ray to pass through;
the first lens element group comprises at least one lens element;
a lens element in a first order of the first lens element group counted from the object side is a 1A lens element;
the 1A lens element has positive refracting power, and an optical axis region of the object-side surface of the 1A lens element is convex;
the second lens element group comprises at least two lens elements;
the third lens element group comprises at least two lens elements;
a lens element in a first order of the third lens element group counted from the image side is a 3A lens element;
an optical axis region of the image-side surface of the 3A lens element is concave;
the 3A lens element has negative refracting power;
a lens element in a second order of the third lens element group counted from the image side is a 3B lens element;
an optical axis region of the object-side surface of the 3B lens element is concave and a periphery region of the object-side surface of the 3B lens element is convex;
wherein lens element groups of the optical imaging lens are only the three lens element groups;
wherein when the optical imaging lens is zoomed, at least one lens element group is moved toward a direction of the object side or a direction of the image side along the optical axis.

2. The optical imaging lens of claim 1, wherein the optical imaging lens satisfies the following conditional expression: TTL/Gmax≥5.000, wherein TTL is a distance from the object-side surface of the 1A lens element to an image plane on the optical axis, and Gmax is a maximum value of air gaps of all of the lens elements in the first lens element group to the third lens element group on the optical axis.

3. The optical imaging lens of claim 1, wherein the optical imaging lens satisfies the following conditional expression: TTL/Fno≥5.000 mm, wherein TTL is a distance from the object-side surface of the 1A lens element to an image plane on the optical axis, and Fno is an f-number of the optical imaging lens.

4. The optical imaging lens of claim 1, wherein the optical imaging lens satisfies the following conditional expression: (Gmax+BFL)/Tavg≤8.000, wherein Gmax is a maximum value of air gaps of all of the lens elements in the first lens element group to the third lens element group on the optical axis, BFL is a distance from the image-side surface of the 3A lens element to an image plane on the optical axis, and Tavg is an average value of the thicknesses of all of the lens elements in the first lens element group to the third lens element group on the optical axis.

5. The optical imaging lens of claim 1, wherein the optical imaging lens satisfies the following conditional expression: (EFL+ImgH)/Fno≥5.000 mm, wherein EFL is an effective focal length of the optical imaging lens, ImgH is an image height of the optical imaging lens, and Fno is an f-number of the optical imaging lens.

6. The optical imaging lens of claim 1, wherein the optical imaging lens satisfies the following conditional expression:

(Gmax+BFL)/(T32+G312)≤4.400, wherein Gmax is a maximum value of air gaps of all of the lens elements in the first lens element group to the third lens element group on the optical axis, BFL is a distance from the image-side surface of the 3A lens element to an image plane on the optical axis, T32 is a thickness of the 3B lens element on the optical axis, and G312 is an air gap between the 3A lens element and the 3B lens element on the optical axis.

7. The optical imaging lens of claim 1, wherein the first lens element group further comprises a 1B lens element, the 1B lens element is a lens element in a second order of the first lens element group counted from the object side, and the optical imaging lens satisfies the following conditional expression: V11+V12+V32≤100.000, wherein V11 is an Abbe number of the 1A lens element, V12 is an Abbe number of the 1B lens element, and V32 is an Abbe number of the 3B lens element.

8. An optical imaging lens, comprising a first lens element group, a second lens element group, and a third lens element group in sequence along an optical axis from an object side to an image side, and lens elements in the first lens element group to the third lens element group each comprise an object-side surface facing the object side and allowing an imaging ray to pass through and an image-side surface facing the image side and allowing the imaging ray to pass through;
the first lens element group comprises at least one lens element;
a lens element in a first order of the first lens element group counted from the object side is a 1A lens element;
an optical axis region of the object-side surface of the 1A lens element is convex and a periphery region of the object-side surface of the 1A lens element is concave;
the second lens element group comprises at least two lens elements;
the third lens element group comprises at least two lens elements;
a lens element in a first order of the third lens element group counted from the image side is a 3A lens element;
an optical axis region of the image-side surface of the 3A lens element is concave;
a lens element in a second order of the third lens element group counted from the image side is a 3B lens element;
the 3B lens element has positive refracting power, and an optical axis region of the object-side surface of the 3B lens element is concave;
wherein a distance from the object-side surface of the 1A lens element to an image plane on the optical axis divided by a maximum value of the thicknesses of all of the lens elements in the first lens element group to the third lens element group on the optical axis is less than or equal to 14.000,
wherein lens element groups of the optical imaging lens are only the three lens element groups;
when the optical imaging lens is zoomed, at least one lens element group is moved toward a direction of the object side or a direction of the image side along the optical axis.

9. The optical imaging lens of claim 8, wherein the first lens element group further comprises a 1B lens element, the 1B lens element is a lens element in a second order of the first lens element group counted from the object side, and the optical imaging lens satisfies the following conditional expression: V12+V31+V32≤130.000, wherein V12 is an Abbe number of the 1B lens element, V31 is an Abbe number of the 3A lens element, and V32 is an Abbe number of the 3B lens element.

10. The optical imaging lens of claim 8, wherein the optical imaging lens satisfies the following conditional expression: (EFL+ImgH)/Fno≤5.000 mm, wherein EFL is an effective focal length of the optical imaging lens, ImgH is an image height of the optical imaging lens, and Fno is an f-number of the optical imaging lens.

11. The optical imaging lens of claim 8, wherein the first lens element group further comprises a 1B lens element, the 1B lens element is a lens element in a second order of the first lens element group counted from the object side, and the optical imaging lens satisfies the following conditional expression: (T11+G112)/T31≤2.500, wherein T11 is a thickness of the 1A lens element on the optical axis, G112 is an air gap between the 1A lens element and the 1B lens element on the optical axis, and T31 is a thickness of the 3A lens element on the optical axis.

12. The optical imaging lens of claim 8, wherein the optical imaging lens satisfies the following conditional expression: TL/(Tmax+Tmin)≤6.000, wherein TL is a distance from the object-side surface of the 1A lens element to the image-side surface of the 3A lens element on the optical axis, Tmax is a maximum value of the thicknesses of all of the lens elements in the first lens element group to the third lens element group on the optical axis, and Tmin is a minimum value of the thicknesses of all of the lens elements in the first lens element group to the third lens element group on the optical axis.

13. The optical imaging lens of claim 8, wherein the first lens element group further comprises a 1B lens element, the 1B lens element is a lens element in a second order of the first lens element group counted from the object side, and the optical imaging lens satisfies the following conditional expression: (T11+G112+T12)/Tavg≤2.000, wherein T11 is a thickness of the 1A lens element on the optical axis, G112 is an air gap between the 1A lens element and the 1B lens element on the optical axis, T12 is a thickness of the 1B lens element on the optical axis, and Tavg is an average value of thicknesses of all of the lens elements on the optical axis in the first lens element group to the third lens element group.

14. The optical imaging lens of claim 8, wherein the optical imaging lens satisfies the following conditional expression: ALT/Gmax≥1.900, wherein ALT is a sum of the thicknesses of all of the lens elements in the first lens element group to the third lens element group on the optical axis, and Gmax is a maximum value of air gaps of all of the lens elements in the first lens element group to the third lens element group on the optical axis.

15. An optical imaging lens, comprising a first lens element group, a second lens element group, and a third lens element group in sequence along an optical axis from an object side to an image side, and lens elements in the first lens element group to the third lens element group each comprise an object-side surface facing the object side and allowing an imaging ray to pass through and an image-side surface facing the image side and allowing the imaging ray to pass through;
the first lens element group comprises at least one lens element;
a lens element in a first order of the first lens element group counted from the object side is a 1A lens element;
an optical axis region of the image-side surface of the 1A lens element is convex and a periphery region of the image-side surface of the 1A lens element is convex;

the second lens element group comprises at least two lens elements;

the third lens element group comprises at least two lens elements;

a lens element in a first order of the third lens element group counted from the image side is a 3A lens element;

an optical axis region of the image-side surface of the 3A lens element is concave;

a lens element in a second order of the third lens element group counted from the image side is a 3B lens element;

an optical axis region of the object-side surface of the 3B lens element is concave and an optical axis region of the image-side surface of the 3B lens element is convex;

wherein a distance from the object-side surface of the 1A lens element to an image plane on the optical axis divided by a maximum value of the thicknesses of all of the lens elements in the first lens element group to the third lens element group on the optical axis is less than or equal to 14.000, wherein lens element groups of the optical imaging lens are only the three lens element groups;

when the optical imaging lens is zoomed, at least one lens element group is moved toward a direction of the object side or a direction of the image side along the optical axis;

wherein the first lens element group further comprises a 1B lens element, the 1B lens element is a lens element in a second order of the first lens element group counted from the object side, and the optical imaging lens satisfies the following conditional expression: $(T11+T12)/T32 \leq 1.000$, wherein T11 is a thickness of the 1A lens element on the optical axis, T12 is a thickness of the 1B lens element on the optical axis, and T32 is a thickness of the 3B lens element on the optical axis.

16. The optical imaging lens of claim 15, wherein the optical imaging lens satisfies the following conditional expression: $V11+V31 \leq 100.000$, wherein V11 is an Abbe number of the 1A lens element, and V31 is an Abbe number of the 3A lens element.

17. The optical imaging lens of claim 15, wherein the optical imaging lens satisfies the following conditional expression: $ALT/(Tmax+Tmin) \leq 4.000$, wherein ALT is a sum of the thicknesses of all of the lens elements in the first lens element group to the third lens element group on the optical axis, Tmax is a maximum value of the thicknesses of all of the lens elements in the first lens element group to the third lens element group on the optical axis, and Tmin is a minimum value of the thicknesses of all of the lens elements in the first lens element group to the third lens element group on the optical axis.

18. The optical imaging lens of claim 15, wherein the optical imaging lens satisfies the following conditional expression: $(T32+G312+T31)/Tmin \geq 6.000$, wherein G312 is an air gap between the 3A lens element and the 3B lens element on the optical axis, T31 is a thickness of the 3A lens element on the optical axis, and Tmin is a minimum value of the thicknesses of all of the lens elements in the first lens element group to the third lens element group on the optical axis.

19. The optical imaging lens of claim 15, wherein the optical imaging lens satisfies the following conditional expression: $TL/Tavg \leq 18.000$, wherein TL is a distance from the object-side surface of the 1A lens element to the image-side surface of the 3A lens element on the optical axis, and Tavg is an average value of the thicknesses of all of the lens elements in the first lens element group to the third lens element group on the optical axis.

* * * * *